(12) United States Patent
Levine

(10) Patent No.: US 6,320,965 B1
(45) Date of Patent: Nov. 20, 2001

(54) SECURE WATERMARK METHOD AND APPARATUS FOR DIGITAL SIGNALS

(75) Inventor: Earl Levine, Palo Alto, CA (US)

(73) Assignee: Liquid Audio, Inc., Redwood City, CA (US)

(*) Notice: Subject to any disclaimer, the term of this patent is extended or adjusted under 35 U.S.C. 154(b) by 0 days.

(21) Appl. No.: 09/172,937

(22) Filed: Oct. 14, 1998

(51) Int. Cl.$^7$ ............... H04L 9/18; H04L 9/12; H04L 27/30

(52) U.S. Cl. ............... 380/34; 380/36; 380/37; 380/54; 380/205; 375/130; 713/176; 713/179

(58) Field of Search ............... 713/176, 179; 380/31, 34, 36, 37, 42, 46, 54, 205, 210, 212, 220, 253; 455/61, 102; 375/130, 142, 150, 152, 200; 382/284, 100; 348/584

(56) References Cited

U.S. PATENT DOCUMENTS

| | | | |
|---|---|---|---|
| 5,418,713 | 5/1995 | Allen | 364/403 |
| 5,613,004 | 3/1997 | Cooperman et al. | 380/28 |
| 5,636,276 | 6/1997 | Brugger | 380/4 |
| 5,651,090 | 7/1997 | Moriya et al. | 395/2.31 |
| 5,684,920 | 11/1997 | Iwakami et al. | 395/2.12 |
| 5,721,788 | 2/1998 | Powell et al. | 382/100 |
| 5,727,092 | 3/1998 | Sanford, II et al. | 382/251 |
| 5,727,119 | 3/1998 | Davidson et al. | 395/2.12 |
| 5,732,188 | 3/1998 | Moriya et al. | 395/2.28 |
| 5,734,823 | 3/1998 | Saigh et al. | 395/200.06 |
| 5,734,891 | 3/1998 | Saigh | 395/610 |
| 5,768,426 | 6/1998 | Rhoads | 382/232 |
| 5,794,217 | 8/1998 | Allen | 705/27 |
| 5,822,432 * | 10/1998 | Moskowitz et al. | 380/28 |
| 5,825,892 | 10/1998 | Braudaway et al. | 380/51 |
| 5,848,155 * | 12/1998 | Cox | 380/4 |
| 5,889,868 | 3/1999 | Moskowitz et al. | 380/51 |
| 5,933,798 | 8/1999 | Linnartz | 702/191 |
| 5,956,674 | 9/1999 | Smyth et al. | 704/229 |
| 5,960,081 | 9/1999 | Vynne et al. | 380/10 |
| 5,960,390 | 9/1999 | Ueno et al. | 704/229 |
| 6,031,914 * | 2/2000 | Tewfik et al. | 380/54 |

OTHER PUBLICATIONS

I.J. Cox et al., "Secure Spread Spectrum Watermarking for Multimedia," IEEE Trans. on Image Processing, vol. 6, No. 12, Dec. 1997, pp. 1673–1687.*

* cited by examiner

Primary Examiner—Gail Hayes
Assistant Examiner—Justin T. Darrow
(74) Attorney, Agent, or Firm—James D. Ivey

(57) ABSTRACT

Watermark data is encoded in a digitized signal by forming a noise threshold spectrum which represents a maximum amount of imperceptible noise, spread-spectrum chipping the noise threshold spectrum with a relatively endless stream of pseudo-random bits to form a basis signal, dividing the basis signal into segments, and filtering the segments to smooth segment boundaries. The data encoded in the watermark signal is precoded to make the watermark data inversion robust and is convolutional encoded to further increase the likelihood that the watermark data will subsequently be retrievable notwithstanding lossy processing of the watermarked signal. To produce the endless pseudo-random bit stream, subsequent bits of the sequence are generated in a pseudo-random manner from previous bits of the sequence. The pseudo-random bits are appended to the stream of pseudo-random bits and, additionally, replace a number of bits of the state. The remaining bits are shifted such that, in effect, the least recently generated bits of the state are discarded. Thus, after production of a number of pseudo-random bits of the stream, the state changes significantly. Accordingly, repeating the above process generates additional pseudo-random bits which are very likely to differ significantly from the previously generated pseudo-random bits. A basis signal is generated by spread-spectrum chipping in accordance with the stream of pseudo-random bits and watermark data is encoded in the basis signal to form a watermark signal which is added to a digitized signal.

51 Claims, 24 Drawing Sheets

| FIGURE 20A |
| FIGURE 20B |

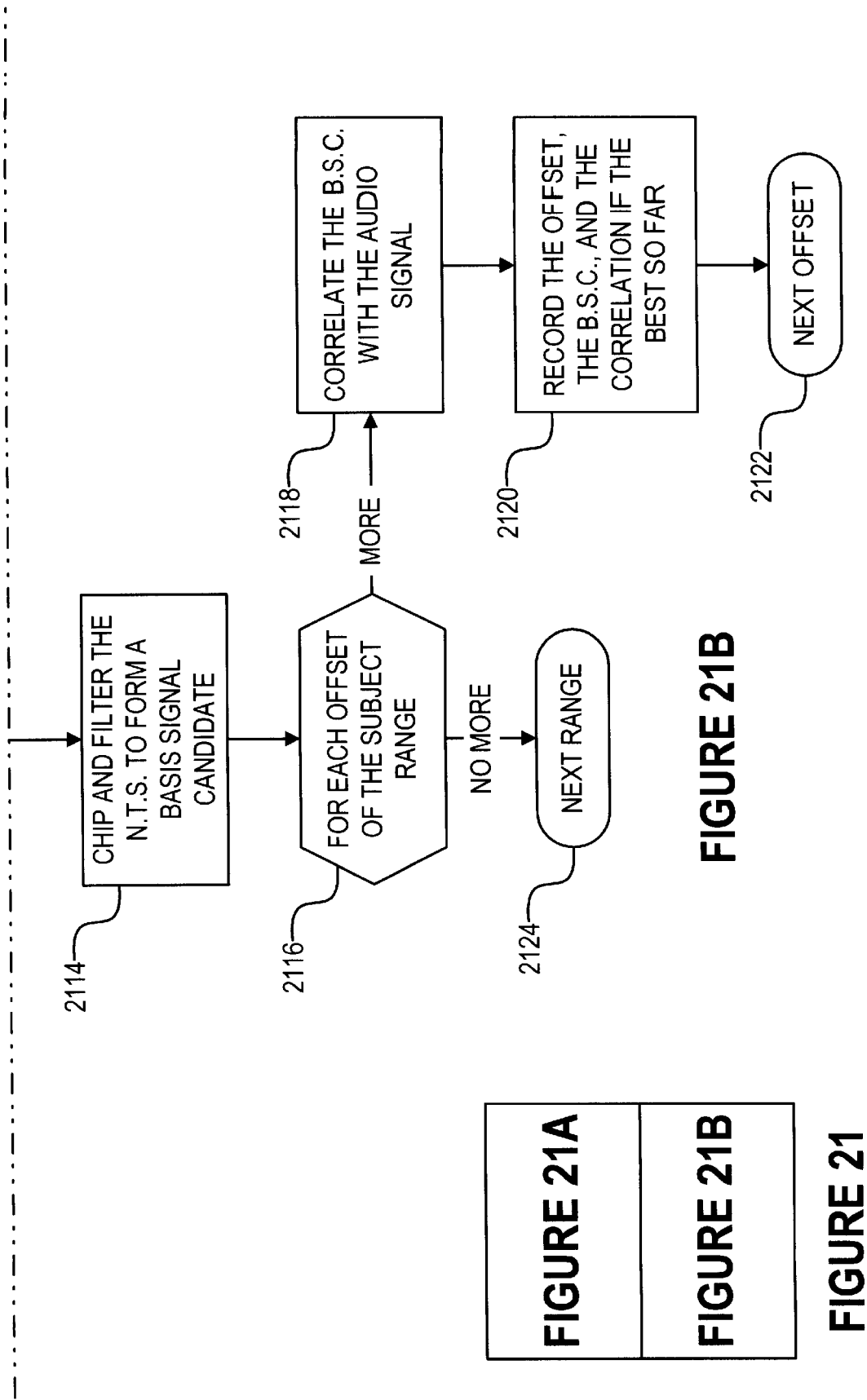

SECURE WATERMARK METHOD AND APPARATUS FOR DIGITAL SIGNALS

CROSS-REFERENCE TO RELATED APPLICATIONS

The present application is related to the following co-pending patent applications which are filed on the same date on which the present application is filed and which are incorporated herein in their entirety by reference:(i) patent application Ser. No. 09/172,583 entitled "Robust Watermark Method and Apparatus for Digital Signals" by Earl Levine; (ii) patent application Ser. No. 09/172,936 entitled "Robust Watermark Method and Apparatus for Digital Signals" by Earl Levine and Jason S. Brownell; (iii) patent application Ser. No. 09/172,922 entitled "Robust Watermark Method and Apparatus for Digital Signals" by Earl Levine; and (iv) patent application Ser. No. 09/172,922 entitled "Efficient Watermark Method and Apparatus for Digital Signals" by Earl Levine.

FIELD OF THE INVENTION

The present invention relates to digital signal processing and, in particular, to a particularly robust watermark mechanism by which identifying data can be encoded into digital signals such as audio or video signals such that the identifying data are not perceptible to a human viewer of the substantive content of the digital signals yet are retrievable and are sufficiently robust to survive other digital signal processing.

BACKGROUND OF THE INVENTION

Video and audio data have traditionally been recorded and delivered as analog signals. However, digital signals are becoming the transmission medium of choice for video, audio, audiovisual, and multimedia information. Digital audio and video signals are currently delivered widely through digital satellites, digital cable, and computer networks such as local area networks and wide area networks, e.g., the Internet. In addition, digital audio and video signals are currently available in the form of digitally recorded material such as audio compact discs, digital audio tape (DAT), minidisc, and laserdisc and digital video disc (DVD) video media. As used herein, a digitized signal refers to a digital signal whose substantive content is generally analog in nature, i.e., can be represented by an analog signal. For example, digital video and digital audio signals are digitized signals since video images and audio content can be represented by analog signals.

The current tremendous growth of digitally stored and delivered audio and video is that digital copies which have exactly the same quality of the original digitized signal can easily be made and distributed without authorization notwithstanding illegality of such copying. The substantive content of digitized signals can have significant proprietary value which is susceptible to considerable diminution as a result of unauthorized duplication.

It is therefore desirable to include identifying data in digitized signals having valuable content such that duplication of the digitized signals also duplicates the identifying data and the source of such duplication can be identified. The identifying data should not result in humanly perceptible changes to the substantive content of the digitized signal when the substantive content is presented to a human viewer as audio and/or video. Since substantial value is in the substantive content itself and in its quality, any humanly perceptible degradation of the substantive content substantially diminishes the value of the digitized signal. Such imperceptible identifying data included in a digitized signal is generally known as a watermark.

Such watermarks should be robust in that signal processing of a digitized signal which affects the substantive content of the digitized signal to a limited, generally imperceptible degree should not affect the watermark so as to make the watermark unreadable. For example, simple conversion of the digital signal to an analog signal and conversion of the analog signal to a new digital signal should not erode the watermark substantially or, at least, should not render the watermark irretrievable. Conventional watermarks which hide identifying data in unused bits of a digitized signal can be defeated in such a digital-analog-digital conversion. In addition, simple inversion of each digitized amplitude, which results in a different digitized signal of equivalent substantive content when the content is audio, should not render the watermark unreadable. Similarly, addition or removal of a number of samples at the beginning of a digitized signal should not render a watermark unreadable. For example, prefixing a digitized audio signal with a one-tenth-second period of silence should not substantially affect ability to recognize and/or retrieve the watermark. Similarly, addition of an extra scanline or an extra pixel or two at the beginning of each scanline of a graphical image should not render any watermark of the graphical image unrecognizable and/or irretrievable.

Digitized signals are often compressed for various reasons, including delivery through a communications or storage medium of limited bandwidth and archival. Such compression can be lossy in that some of the signal of the substantive content is lost during such compression. In general, the object of such lossy compression is to limit loss of signal to levels which are not perceptible to a human viewer or listener of the substantive content when the compressed signal is subsequently reconstructed and played for the viewer or listener. A watermark should survive such lossy compression as well as other types of lossy signal processing and should remain readable within in the reconstructed digitized signal.

In addition to being robust, the watermark should be relatively difficult to detect without specific knowledge regarding the manner in which the watermark is added to the digitized signal. Consider, for example, an owner of a watermarked digitized signal, e.g., a watermarked digitized music signal on a compact disc. If the owner can detect the watermark, the owner may be able to fashion a filter which can remove the watermark or render the watermark unreadable without introducing any perceptible effects to the substantive content of the digitized signal. Accordingly, the value of the substantive content would be preserved and the owner could make unauthorized copies of the digitized signal in a manner in which the watermark cannot identify the owner as the source of the copies. Accordingly, watermarks should be secure and generally undetectable without special knowledge with respect to the specific encoding of such watermarks.

What is needed is a watermark system in which identifying data can be securely and robustly included in a digitized signal such that the source of such a digitized signal can be determined notwithstanding lossy and non-lossy signal processing of the digitized signal.

SUMMARY OF THE INVENTION

In accordance with the present invention, security of watermark data embedded in a watermarked signal is enhanced by obscuring the watermark data using an endless stream of pseudo-random bits. For example, the watermark data is obscured by encoding the data in a basis signal which is the result of spread-spectrum chipping in accordance with the stream of pseudo-random bits. As a result, successful decoding of the watermark data requires reproducing the spread-spectrum chipped basis signal in accordance with the stream of pseudo-random bits, therefore requiring reproduction of the stream of pseudo-random bits.

The stream of bits which are both reproducible and pseudo-random. The stream is endless in that the bit values are extremely unlikely to repeat until after an extremely long number of bits have been produced. For example, such an endless stream will generally produce repeating patterns of pseudo-random bits which are trillions of bits long. Recognizing such a repeating pattern is a practical impossibility. The length of the repeating pattern is effectively limited only by the finite number of states which can be represented within the pseudo-random generator producing the pseudo-random stream.

To produce an endless pseudo-random bit stream, subsequent bits of the sequence are generated in a pseudo-random manner from previous bits of the sequence. Pseudo-random bits are generated from data stored in a state in a pseudo-random, deterministic manner. The pseudo-random bits are appended to the stream of pseudo-random bits and, additionally, replace a number of bits of the state. The remaining bits are shifted such that, in effect, the least recently generated bits of the state are discarded. Thus, after production of a number of pseudo-random bits of the stream, the state changes significantly. Accordingly, repeating the above process generates additional pseudo-random bits which are very likely to differ significantly from the previously generated pseudo-random bits.

A basis signal is generated by spread-spectrum chipping in accordance with the stream of pseudo-random bits and watermark data is encoded in the basis signal to form a watermark signal which is added to a digitized signal. Recognition of the watermark signal requires generation of a similar basis signal from the watermarked digitized signal. Such generation generally requires reproducing the same stream of pseudo-random bits. Without specific knowledge regarding the initial state, the manner in which pseudo-random bits are generated from the state, and the manner in which the state is updated, it is a practical impossibility to reproduce the stream of pseudo-random bits.

To properly decode the watermark data, the watermarked digitized signal and the basis signal generated from the watermarked digitized signal are correlated and the resulting correlation signal is decoded to produce the watermark data.

Using an endless stream of pseudo-random bits to generate a watermark signal is particularly useful in producing watermark signals for lengthy digitized signals such as long tracks of audio data, e.g., several minutes in length. Such requires generating a very long basis signal and an endless stream of pseudo-random bits lends itself well to generating very long basis signals. In addition, using the stream of pseudo-random bits to form a watermark signal in accordance with the present invention provides a very high degree of security, making unauthorized detection and removal of a watermark signal from a watermarked digital signal nearly impossible.

DETAILED DESCRIPTION

Figure 1:
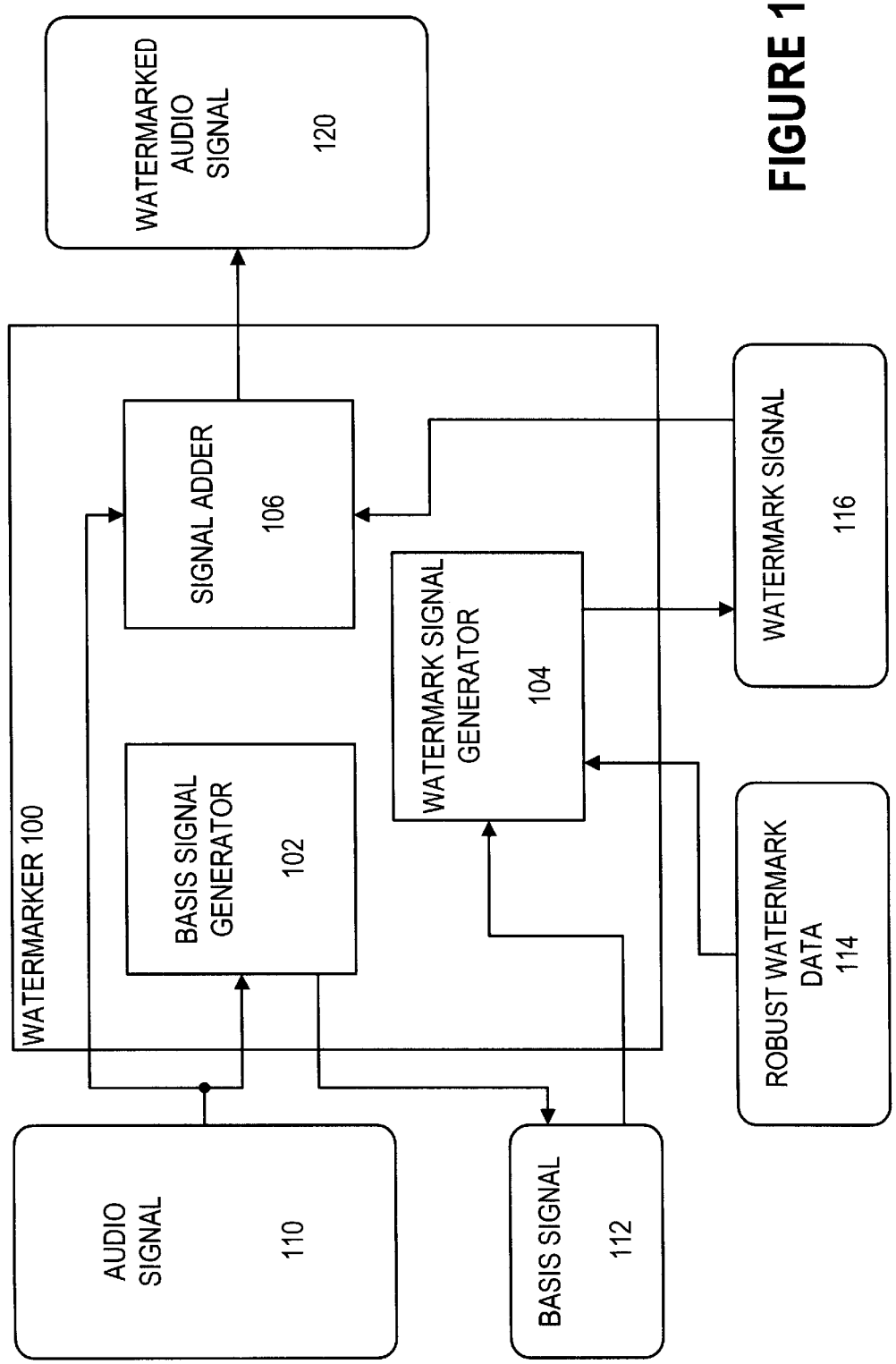
FIG. 1 is a block diagram of a watermarker in accordance with the present invention.

In accordance with the present invention, security of watermark data embedded in a watermarked signal is enhanced by obscuring the watermark data using an endless stream of pseudo-random bits. For example, the watermark data is obscured by encoding the data in a basis signal which is the result of spread-spectrum chipping in accordance with the stream of pseudo-random bits. As a result, successful decoding of the watermark data requires reproducing the spread-spectrum chipped basis signal in accordance with the stream of pseudo-random bits, therefore requiring reproduction of the stream of pseudo-random bits. To facilitate understanding and appreciation of spread-spectrum chipping with an endless stream of pseudo-random bits in accordance with the present invention, the generation and recognition of watermarks in accordance with the present invention are described. While the following description centers primarily on digitized audio signals with a temporal component, it is appreciated that the described watermarking mechanism is applicable to still video images which have a spatial component and to motion video signals which have both a spatial component and a temporal component.

Watermarker 100

A watermarker 100 (FIG. 1) in accordance with the present invention retrieves an audio signal 110 and watermarks audio signal 110 to form watermarked audio signal 120. Specifically, watermarker 100 includes a basis signal generator 102 which creates a basis signal 112 according to audio signal 110 such that inclusion of basis signal 112 with audio signal 110 would be imperceptible to a human listener of the substantive audio content of audio signal 110. In addition, basis signal 112 is secure and efficiently created as described more completely below. Watermarker 100 includes a watermark signal generator 104 which combines basis signal 112 with robust watermark data 114 to form a watermark signal 116. Robust watermark data 114 is formed from raw watermark data 1202 (FIG. 12) and is processed in a manner described more completely below in conjunction with FIG. 12 to form robust watermark data 114. Robust watermark data 114 can more successfully survive adversity such as certain types of signal processing of watermarked audio signal 120 (FIG. 1) and relatively extreme dynamic characteristics of audio signal 110 as described more completely below.

Thus, watermark signal 116 has the security of basis signal 112 and the robustness of robust watermark data 114. Watermarker 100 includes a signal adder 106 which combines watermark signal 116 with audio signal 110 to form watermarked audio signal 120. Reading of the watermark of watermarked audio signal 120 is described more completely below with respect to FIG. 13.

Figure 2:
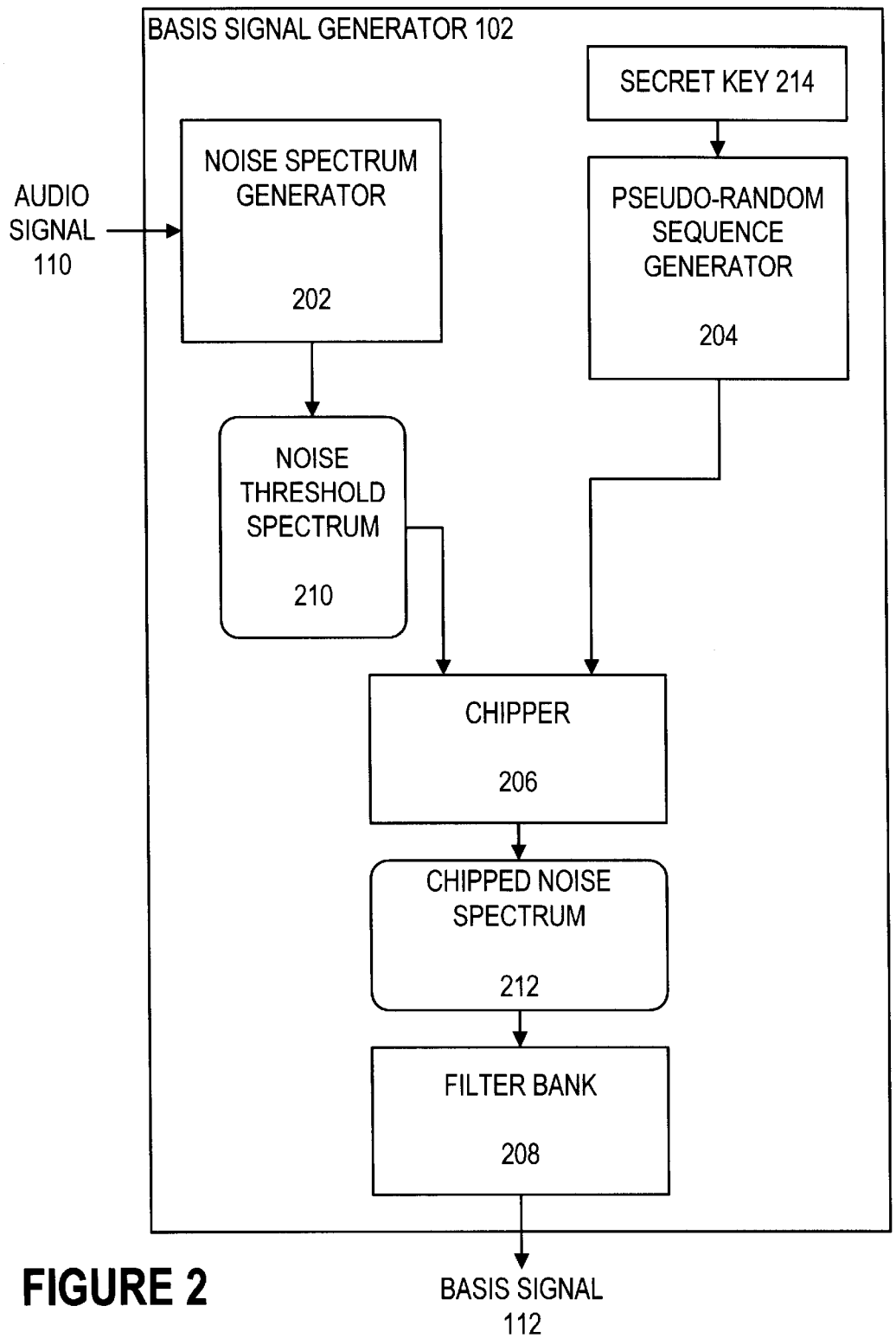
FIG. 2 is a block diagram of the basis signal generator of FIG. 1.

Basis signal generator 102 is shown in greater detail in FIG. 2. Basis signal generator 102 includes a noise spectrum generator 202 which forms a noise threshold spectrum 210 from audio signal 110. Noise threshold spectrum 210 specifies a maximum amount of energy which can be added to audio signal 110 at a particular frequency at a particular time within audio signal 110. Accordingly, noise threshold spectrum 210 defines an envelope of energy within which watermark data such as robust watermark data 114 (FIG. 1) can be encoded within audio signal 110 without effecting perceptible changes in the substantive content of audio signal 110. Noise spectrum generator 202 (FIG. 2) is shown in greater detail in FIG. 3.

Noise spectrum generator 202 includes a prefilter 302 which filters out parts of audio signal 110 which can generally be subsequently filtered without perceptibly affection the substantive content of audio signal 110. In one embodiment, prefilter 302 is a high-pass filter which removes frequencies above approximately 16 kHz. Since such frequencies are generally above the audible range for human listeners, such frequencies can be filtered out of watermarked audio signal 120 (FIG. 1) without perceptibly affecting the substantive content of watermarked audio signal 120. Accordingly, robust watermark data 114 should not be encoded in those frequencies. Prefilter 302 (FIG. 3) ensures that such frequencies are not used for encoding robust watermark data 114 (FIG. 1). Noise spectrum generator 202 (FIG. 3) includes a sub-band signal processor 304 which receives the filtered audio signal from prefilter 302 and produces therefrom a noise threshold spectrum 306. Sub-band signal processor 304 is shown in greater detail in FIG. 4. An alternative, preferred embodiment of sub-band signal processor 304, namely, sub-band signal processor 304B, is described more completely below in conjunction with FIG. 5.

Figure 3:
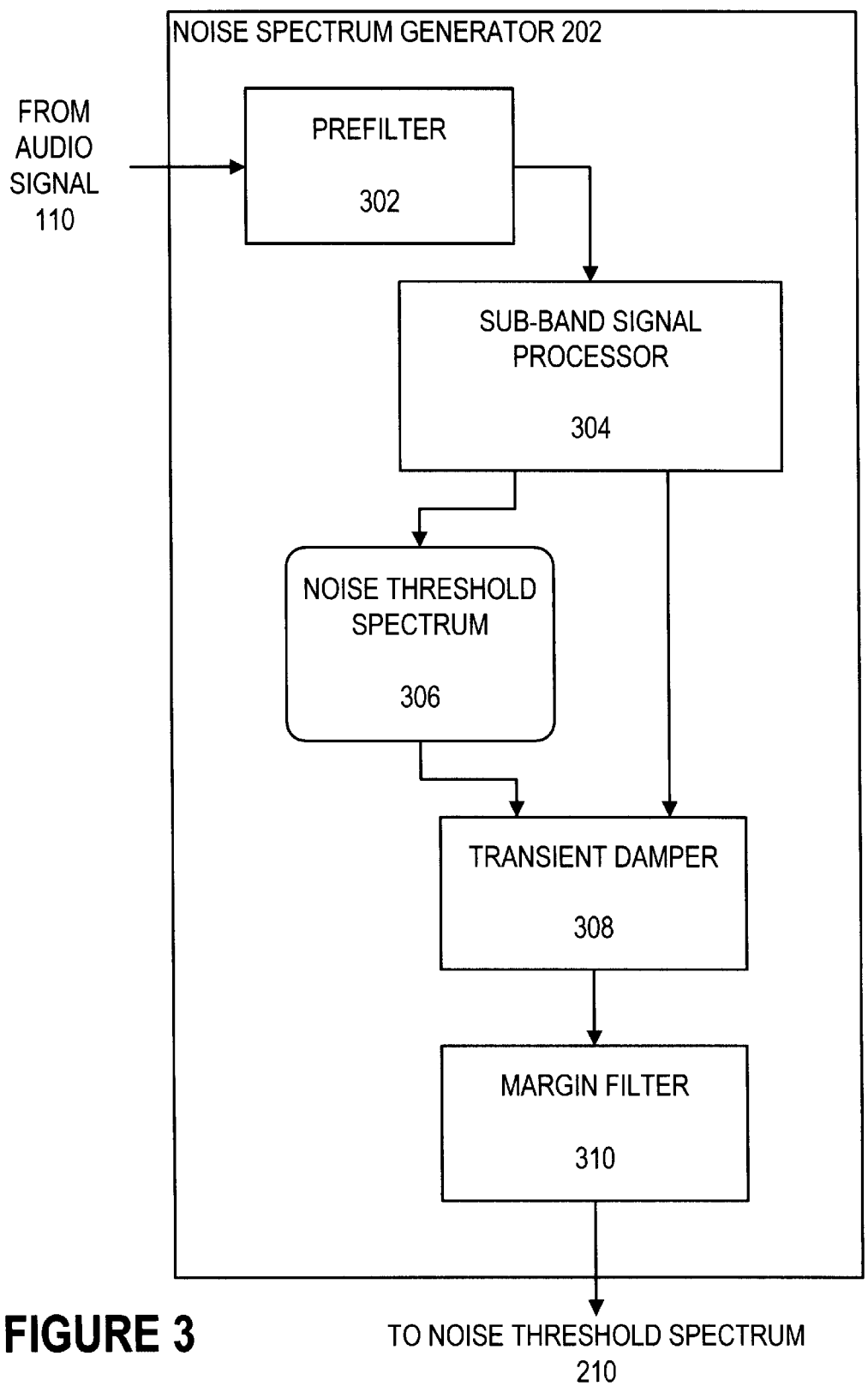
FIG. 3 is a block diagram of the noise spectrum generator of FIG. 2.
Figure 4:
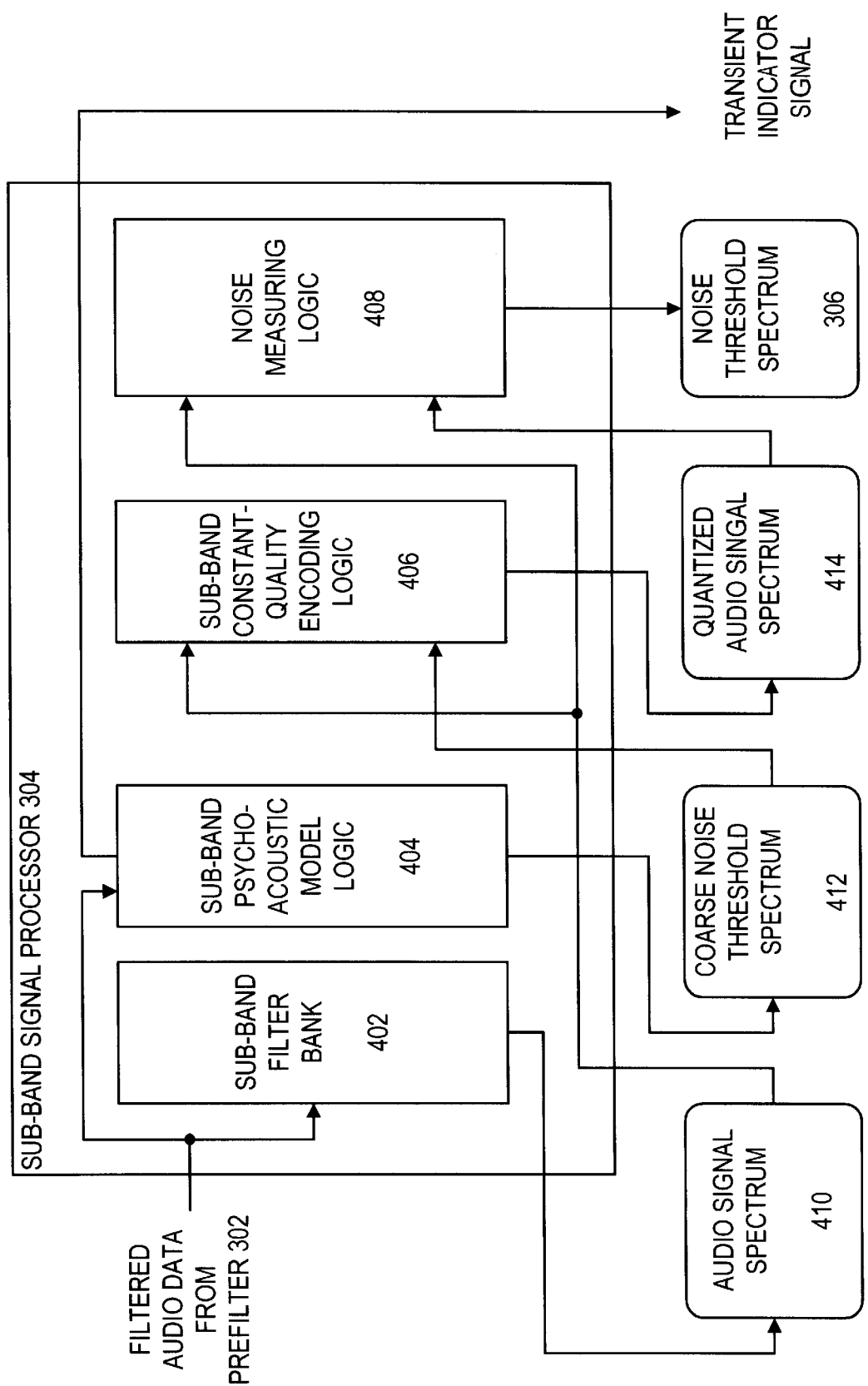
FIG. 4 is a block diagram of the sub-band signal processor of FIG. 3 according to a first embodiment.

Sub-band signal processor 304 (FIG. 4) includes a sub-band filter bank 402 which receives the filtered audio signal from prefilter 302 (FIG. 3) and produces therefrom an audio signal spectrum 410 (FIG. 4). Sub-band filter bank 402 is a conventional filter bank used in conventional sub-band encoders. Such filter banks are known. In one embodiment, sub-band filter bank 402 is the filter bank used in the MPEG (Motion Picture Experts Group) AAC (Advanced Audio Coding) international standard codec (coder-decoder) (generally known as AAC) and is a variety of overlapped-windowed MDCT (modified discrete cosine transform) window filter banks. Audio signal spectrum 410 specifies energy of the received filtered audio signal at particular frequencies at particular times within the filtered audio signal.

Sub-band signal processor 304 also includes sub-band psycho-acoustic model logic 404 which determines an amount of energy which can be added to the filtered audio signal of prefilter 302 without such added energy perceptibly changing the substantive content of the audio signal. Sub-band psycho-acoustic model logic 404 also detects transients in the audio signal, i.e., sharp changes in the substantive content of the audio signal in a short period of time. For example, percussive sounds are frequently detected as transients in the audio signal. Sub-band psycho-acoustic model logic 404 is a conventional psycho-acoustic model logic 404 used in conventional sub-band encoders. Such psycho-acoustic models are known. For example, sub-band encoders which are used in lossy compression mechanisms include psycho-acoustic models such as that of sub-band psycho-acoustic model logic 404 to determine an amount of noise which can be introduced in such lossy compression without perceptibly affecting the substantive content of the audio signal. In one embodiment, sub-band psycho-acoustic model logic 404 is the MPEG Psychoacoustic Model II which is described for example in *ISO/IEC JTC 1/SC 29/WG* 11, "ISO/EEC 11172-3: Information Technology—Coding of Moving Pictures and Associated Audio for Digital Storage Media at up to about 1.5 mbit/s—Part 3: Audio" (1993). Of course, in embodiments other than the described illustrative embodiment, other psycho-sensory models can be used. For example, if watermarker 100 (FIG. 1) watermarks still and/or motion video signals, sub-band psycho-acoustic model logic 404 (FIG. 4) is replaced with psycho-visual model logic. Other psycho-sensory models are known and can be employed to determine what characteristics of digitized signals are perceptible by human sensory perception. The description of a sub-band psycho-acoustic model is merely illustrative.

Sub-band psycho-acoustic model logic 404 forms a coarse noise threshold spectrum 412 which specifies an allowable amount of added energy for various ranges of frequencies of the received filtered audio signal at particular times within the filtered audio signal.

Noise threshold spectrum 306 includes data which specifies an allowable amount of added energy for significantly narrower ranges of frequencies of the filtered audio signal at particular times within the filtered audio signal. Accordingly, the ranges of frequencies specified in coarse noise threshold spectrum 412 are generally insufficient for forming basis signal 112 (FIG. 1), and processing beyond conventional sub-band psycho-acoustic modeling is typically required. Sub-band signal processor 304 therefore includes a sub-band constant-quality encoding logic 406 to fully quantize audio signal spectrum 410 according to coarse noise threshold spectrum 412 using a constant quality model.

Constant quality models for sub-band encoding of digital signals are known. Briefly, constant quality models allow the encoding to degrade the digital signal by a predetermined, constant amount over the entire temporal dimension of the digital signal. Some conventional watermarking systems employ constant-rate quantization to determine a maximum amount of permissible noise to be added as a watermark. Constant-rate quantization is more commonly used in sub-band processing and results in a constant bit-rate when encoding a signal using sub-band constant-rate encoding while permitting signal quality to vary somewhat. However, constant-quality quantization modeling allows as much signal as possible to be used to represent watermark data while maintaining a constant level of signal quality, e.g., selected near the limit of human perception. In particular, more energy can be used to represent watermark data in parts of audio signal 110 (FIG. 1) which can tolerate extra noise without being perceptible to a human listener and quality of audio signal 110 is not compromised in parts of audio signal 110 in which even small quantities of noise will be humanly perceptible.

In fully quantizing audio signal spectrum 410 (FIG. 4), sub-band constant-quality encoding logic 406 forms quantized audio signal spectrum 414. Quantized audio signal spectrum 414 is generally equivalent to audio signal spectrum 410 except that quantized audio signal spectrum 414 includes quantized approximations of the energies represented in audio signal spectrum 410. In particular, both audio signal spectrum 410 and quantized audio signal spectrum 414 store data representing energy at various frequencies over time. The energy at each frequency at each time within quantized audio signal spectrum 414 is the result of quantizing the energy of audio signal spectrum 410 at the same frequency and time. As a result, quantized audio signal spectrum 414 has lost some of the signal of audio signal spectrum 410 and the lost signal is equivalent to added noise.

Noise measuring logic 408 measures differences between audio signal spectrum 410 and quantized audio signal spectrum 414 and stores the measured differences as allowable noise thresholds for each frequency over time within the filtered audio signal as noise threshold spectrum 306. Accordingly, noise threshold spectrum 306 includes noise thresholds in significantly finer detail, i.e., for much narrower ranges of frequencies, than coarse noise threshold spectrum 412.

Sub-band signal processor 304B (FIG. 5) is an alternative embodiment of sub-band signal processor 304 (FIG. 4) and requires substantially less processing resources to form noise threshold spectrum 306. Sub-band signal processor 304B (FIG. 5) includes sub-band filter bank 402B and sub-band psycho-acoustic model logic 404B which are directly analogous to sub-band filter band 402 (FIG. 4) and sub-band psycho-acoustic model logic 404, respectively. Sub-band filter bank 402B (FIG. 5) and sub-band psycho-acoustic model logic 404B produce audio signal spectrum 410 and coarse noise threshold 412, respectively, in the manner described above with respect to FIG. 4.

The majority, e.g., typically approximately 80%, of processing by sub-band signal processor 304 (FIG. 4) involves quantization of audio signal spectrum 410 by sub-band constant-quality encoding logic 406. Such typically involves an iterative search for a relatively optimum gain for which quantization precisely fits the noise thresholds specified within coarse noise threshold 412. For example, quantizing audio signal spectrum 410 with a larger gain produces finer signal detail and less noise in quantized audio signal spectrum 414. If the noise is less than that specified in coarse noise threshold spectrum 412, additional noise could be added to quantized audio signal spectrum 414 without being perceptible to a human listener. Such extra noise could be used to more robustly represent watermark data. Conversely, quantizing audio signal spectrum 410 with a smaller gain produces coarser signal detail and more noise in quantized audio signal spectrum 414. If the noise is greater than that specified in coarse noise threshold spectrum 412, such noise could be perceptible to a human listener and could therefore unnecessarily degrade the value of the audio signal. The iterative search for a relatively optimum gain requires substantial processing resources.

Figure 5:
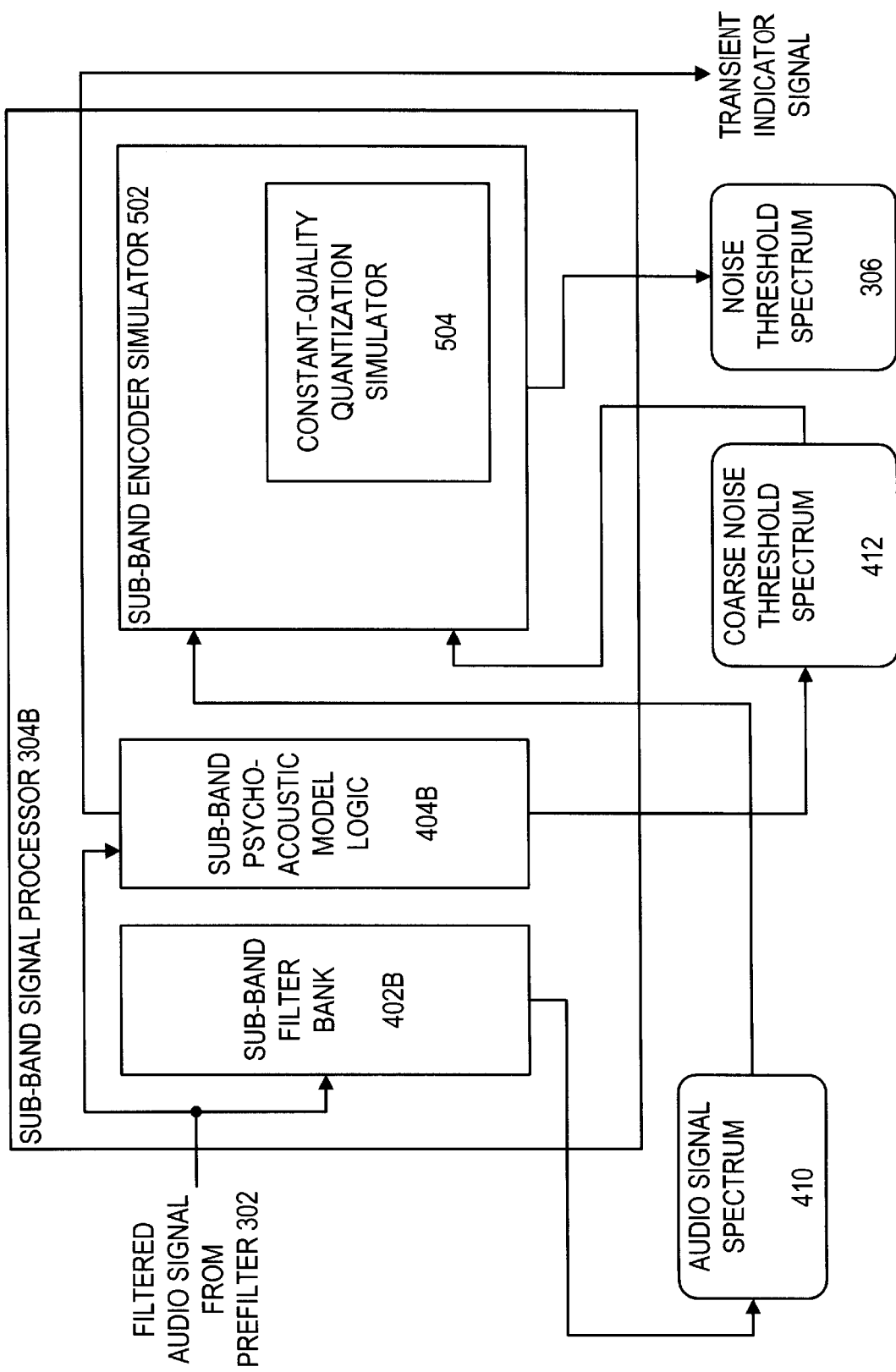
FIG. 5 is a block diagram of the sub-band signal processor of FIG. 3 according to a second, alternative embodiment.

Sub-band signal processor 304B (FIG. 5) obviates most of such processing by replacing sub-band constant-quality encoding logic 406 (FIG. 4) and noise measuring logic 408 with sub-band encoder simulator 502 (FIG. 5). Sub-band encoder simulator 502 uses a constant quality quantization simulator 504 to estimate the amount of noise introduced for a particular gain during quantization of audio signal spectrum 410. Constant quality quantization simulator 504 uses a constant-quality quantization model and therefore realizes the benefits of constant-quality quantization modeling described above.

Figure 7:
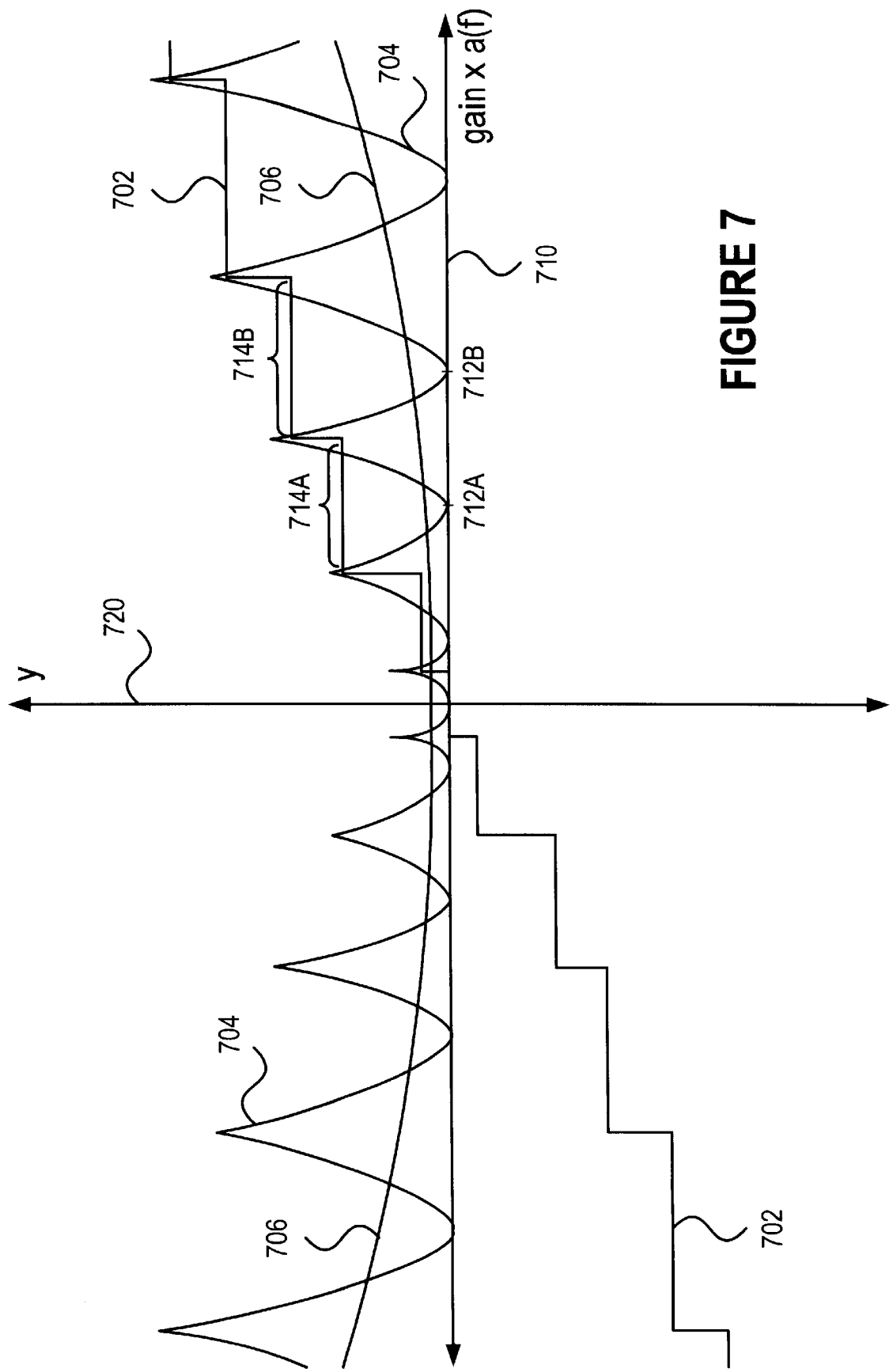
FIG. 7 is a graph illustrating the estimation of constant-quality quantization by the constant-quality quantization simulator of FIG. 5.

Graph 700 (FIG. 7) illustrates noise estimation by constant quality quantization simulator 504. Function 702 shows the relation between gain-adjusted amplitude at a particular frequency prior to quantization—along axis 710—to gain-adjusted amplitude at the same frequency after quantization—along axis 720. Function 704 shows noise power in a quantized signal as the square of the difference between the original signal prior to quantization and the signal after quantization. In particular, noise power is represented along axis 720 while gain-adjusted amplitude at specific frequencies at a particular time is represented along axis 710. As can be seen from FIG. 7, function 704 has extreme transitions at quantization boundaries. In particular, function 704 is not continuously differentiable. Function 704 does not lend itself to convenient mathematical representation and makes immediate solving for a relatively optimum gain intractable. As a result, determination of a relatively optimum gain for quantization typically requires full quantization and iterative searching in the manner described above.

In contrast, constant quality quantization simulator 504 (FIG. 5) uses a function 706 (FIG. 7) which approximates an average noise power level for each gain-adjusted amplitude at specific frequencies at a particular time as represented along axis 710. Function 706 is a smooth approximation of function 704 and is therefore an approximation of the amount of noise power that is introduced by quantization of audio signal spectrum 410 (FIG. 5). In one embodiment, function 706 can be represented mathematically as the following equation.

$$y = \frac{\Delta(z)^2}{12} \quad (1)$$

In equation (1), y represents the estimated noise power introduced by quantization, z represents the audio signal amplitude sample prior to quantization, and $\Delta(z)$ represents a local step size of the quantization function, i.e., function 702. The step size of function 702 is the width of each quantization step of function 702 along axis 710. The step sizes for various gain adjusted amplitudes along axis 710 are interpolated along axis 710 to provide a local step size which is a smooth, continuously differentiable function, namely, $\Delta(z)$ of equation (1). The function $\Delta(z)$ is dependent upon the particular quantization function used, i.e., upon quantization function 702.

The following is illustrative. Gain-adjusted amplitude 712A is associated with a step size of step 714A since gain-adjusted amplitude 712A is centered with respect to step 714A. Similarly, gain-adjusted amplitude 712B is associated with a step size of step 714B since gain-adjusted amplitude 712B is centered with respect to step 714B. Local step sizes for gain-adjusted amplitudes between gain-adjusted amplitudes 712A–B are determined by interpolating between the respective sizes of steps 714A–B. The result of such interpolation is the continuously differentiable function $\Delta(z)$.

Sub-band encoder simulator 502 (FIG. 5) uses the approximated noise power estimated by constant-quality quantization simulator 504 according to equation (1) above to quickly and efficiently determine a relatively optimum gain for each region of frequencies specified in coarse noise threshold spectrum 412. Specifically, sub-band encoder simulator 502 sums all estimated noise power for all individual frequencies in a region of coarse noise threshold spectrum 412 as a function of gain. Sub-band encoder simulator 502 constrains the summed noise power to be no greater than the noise threshold specified within coarse noise threshold spectrum 412 for the particular region. To determine the relatively optimum gain for the region, sub-band encoder simulator 502 solves the constrained summed noise power for the variable gain. As a result, relatively simple mathematical processing provides a relatively optimum gain for the region in coarse noise threshold spectrum 412. For each frequency within the region, the individual noise threshold as represented in noise threshold spectrum 306 is the difference between the amplitude in audio signal spectrum 410 for the individual frequency of the region and the same amplitude adjusted by the relatively optimum gain just determined.

Much, e.g., 80% of the processing of sub-band constant-quality encoding logic 406 (FIG. 4) in quantizing audio signal spectrum 410 is used to iteratively search for an appropriate gain such that quantization satisfied coarse noise threshold spectrum 412. By using constant quality quantization simulator 504 (FIG. 5) in the manner described above to determine a nearly optimum gain for such quantization, sub-band encoder simulator 502 quickly and efficiently determines the nearly optimum gain, and thus noise threshold spectrum 306, using substantially less processing resources and time. Additional benefits to using constant-quality quantization simulator 504 are described in greater detail below in conjunction with decoding watermarks.

The result of either sub-band signal processor 304 (FIG. 4) or sub-band signal processor 304B (FIG. 5) is noise threshold spectrum 306 in which a noise threshold is determined for each frequency and each relative time represented within audio signal spectrum 306. Noise threshold spectrum 306 therefore specifies a spectral/temporal grid of amounts of noise that can be added to audio signal 110 (FIG. 1) without being perceived by a human listener. Noise spectrum generator 202 (FIG. 2) includes a transient damper 308 which receives both noise threshold spectrum 306 and a transient indicator signal from sub-band psycho-acoustic model logic 404 (FIG. 4) or, alternatively, sub-band psycho-acoustic model logic 404B (FIG. 5). Sub-band psycho-acoustic model logic 404 and 404B indicate through the transient indicator signal whether a particular time within noise threshold spectrum 306 which correspond to large, rapid changes in the substantive content of audio signal 110 (FIG. 1). Such changes include, for example, percussion and plucking of stringed instruments. Recognition of transients by sub-band psycho-acoustic model logic 404 and 404B is conventional and known and is not described further herein. Even small amounts of noise added to an audio signal during transients can be perceptible to a human listener. Accordingly, transient damper 308 (FIG. 3) reduces noise thresholds corresponding to such times within noise threshold spectrum 306. Such reduction can be reduction by a predetermined percentage or can be reduction to a predetermined maximum transient threshold. In one embodiment, transient damper 308 reduces noise thresholds within noise threshold spectrum 306 corresponding to times of transients within audio signal 110 (FIG. 1) by a predetermined percentage of 100% or, equivalently, to a predetermined maximum transient threshold of zero. Accordingly, transient damper 308 (FIG. 3) prevents addition of a watermark to audio signal 110 (FIG. 1) to be perceptible to a human listener during transients of the substantive content of audio signal 110.

Noise spectrum generator 202 (FIG. 3) includes a margin filter 310 which receives the transient-dampened noise threshold spectrum from transient damper 308. The noise thresholds represented within noise threshold spectrum 306 which are not dampened by transient damper 308 represent the maximum amount of energy which can be added to audio signal 110 (FIG. 1) without being perceptible to an average human listener. However, adding a watermark signal with the maximum amount of perceptible energy risks that a human listener with better-than-average hearing could perceive the added energy as a distortion of the substantive content. Listeners with most interest in the quality of the substantive content of audio signal 110 are typically those with the most acute hearing perception. Accordingly, it is preferred that less than the maximum imperceptible amount of energy is used for representation of robust watermark data 114. Therefore, margin filter 310 (FIG. 3) reduces each of the noise thresholds represented within the transient-dampened noise threshold spectrum by a predetermined margin to ensure that even discriminating human listeners with exceptional hearing cannot perceive watermark signal 116 (FIG. 1) when added to audio signal 110. In one embodiment, the predetermined margin is 10%.

Noise threshold spectrum 210 therefore specifies a spectral/temporal grid of amounts of noise that can be added to audio signal 110 (FIG. 1) without being perceptible to a human listener. To form basis signal 112, a reproducible, pseudo-random wave pattern is formed within the energy envelope of noise threshold spectrum 210. In this embodiment, the wave pattern is generated using a sequence of reproducible, pseudo-random bits. It is preferred that the length of the bit pattern is longer rather than shorter since shorter pseudo-random bit sequences might be detectable by one hoping to remove a watermark from watermarked audio signal 120. If the bit sequence is discovered, removing a watermark is as simple as determining the noise threshold spectrum in the manner described above and filtering out the amount of energy of the noise threshold spectrum with the discovered bit sequence. Shorter bit sequences are more easily recognized as repeating patterns.

Pseudo-random sequence generator 204 (FIG. 2) generates an endless stream of bits which are both reproducible and pseudo-random. The stream is endless in that the bit values are extremely unlikely to repeat until after an extremely long number of bits have been produced. For example, an endless stream produced in the manner described below will generally produce repeating patterns of pseudo-random bits which are trillions of bits long. Recognizing such a repeating pattern is a practical impossibility. The length of the repeating pattern is effectively limited only by the finite number of states which can be represented within the pseudo-random generator producing the pseudo-random stream.

Figure 6:
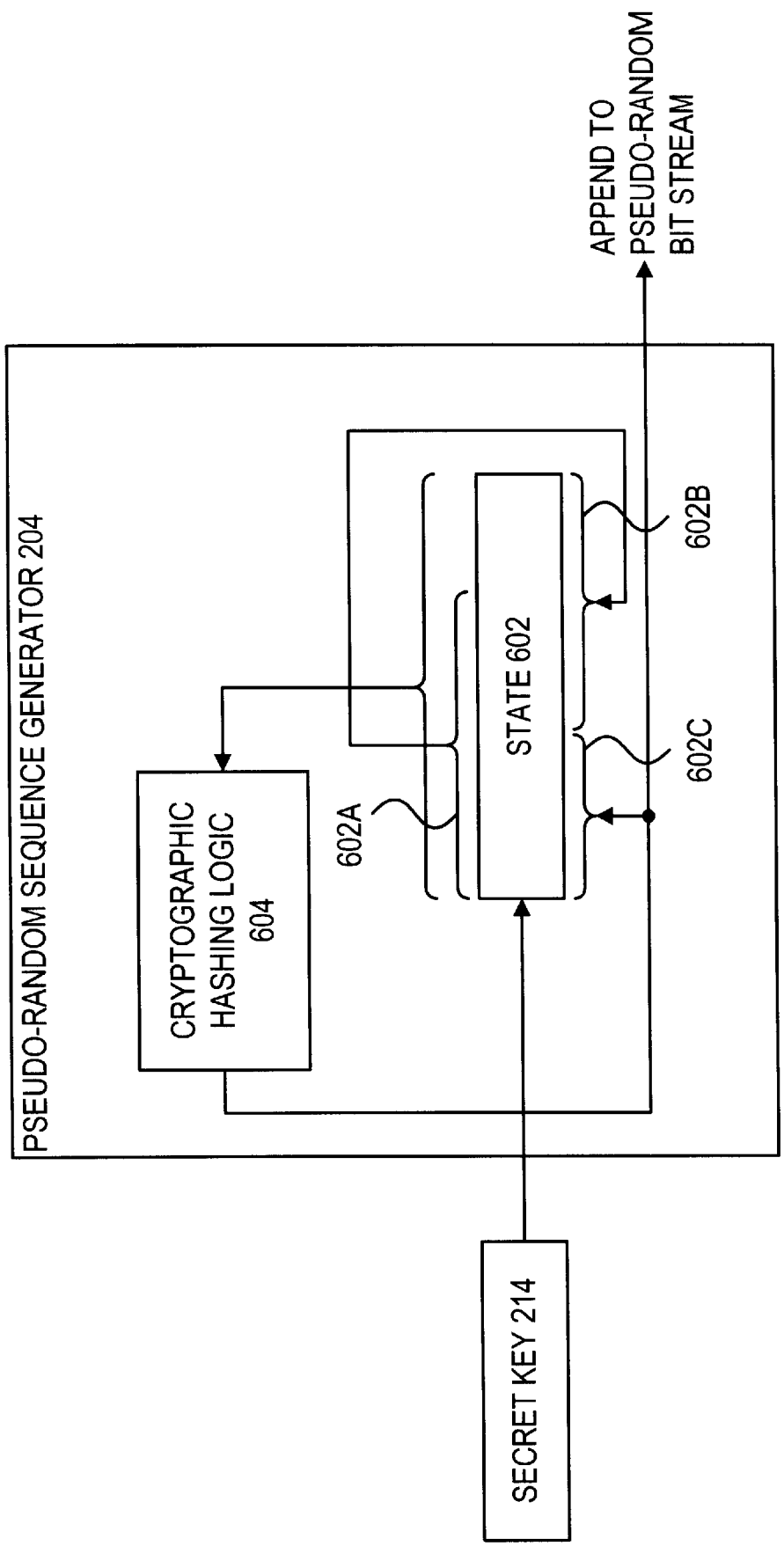
FIG. 6 is a block diagram of the pseudo-random sequence generator of FIG. 2.

The produce an endless pseudo-random bit stream, subsequent bits of the sequence are generated in a pseudo-random manner from previous bits of the sequence. Pseudo-random sequence generator 204 is shown in greater detail in FIG. 6.

Pseudo-random sequence generator 204 includes a state 602 which stores a portion of the generated pseudo-random bit sequence. In one embodiment, state 602 is a register and has a length of 128 bits. Alternatively, state 602 can be a portion of any type of memory readable and writeable by a machine. Initially, bits of a secret key 214 are stored in state 602. Secret key 214 must generally be known to reproduce the pseudo-random bit sequence. Secret key 214 is therefore preferably held in strict confidence. Since secret key 214 represents the initial contents of state 602, secret key 214 has an equivalent length to that of state 602, e.g., 128 bits in one embodiment. In this illustrative embodiment, state 602 can store data representing any of more than $3.4 \times 10^{38}$ distinct states.

A most significant portion 602A of state 602 is shifted to become a least significant portion 602B. To form a new most significant portion 602C of state 602, cryptographic hashing logic 604 retrieves the entirety of state 602, prior to shifting, and cryptographically hashes the data of state 602 to form a number of pseudo-random bits. The pseudo-random bits formed by cryptographic hashing logic 604 are stored as most significant portion 602C and are appended to the endless stream of pseudo-random bits produced by pseudo-random sequence generator 204. The number of hashed bits are equal to the number of bits by which most significant portion 602A are shifted to become least significant portion 602B. In this illustrative embodiment, the number of hashed bits are fewer than the number of bits stored in state 602, e.g., sixteen (16). The hashed bits are pseudo-random in that the specific values of the bits tend to fit a random distribution but are fully reproducible since the hashed bits are produced from the data stored in state 602 in a deterministic fashion.

Thus, after a single state transition, state 602 includes (i) most significant portion 602C which is the result of cryptographic hashing of the previously stored data of state 602 and (ii) least significant portion 602B after shifting most significant portion 602A. In addition, most significant portion 602C is appended to the endless stream of pseudo-random bits produced by pseudo-random sequence generator 204. The shifting and hashing are repeated, with each iteration appending new most significant portions 602C to the pseudo-random bit stream. Due to cryptographic hashing logic 604, most significant portion 602C is very likely different from any same size block of contiguous bits of state 602 and therefore each subsequent set of data in state 602 is very significantly different from the previous set of data in state 602. As a result, the pseudo-random bit stream produced by pseudo-random sequence generator 204 practically never repeats, e.g., typically only after trillions of pseudo-random bits are produced. Of course, some bit patterns may occur more than once in the pseudo-random bit stream, it is extremely unlikely that such bit patterns would be contiguous or would repeat at regular intervals. In particular, cryptographic hashing logic 604 should be configured to make such regularly repeating bit patterns highly unlikely. In one embodiment, cryptographic hashing logic 604 implements the known Message Digest 5 (MD5) hashing mechanism.

While pseudo-random sequence generator 204 shifts most significant portion 602A to become least significant portion 602B to make room for pseudo-random bits as new most significant portion 602C, it is appreciated that pseudo-random sequence generator 204 can also shift least significant bits to become most significant bits to make room for pseudo-random bits as new least significant bits. What should be noted and appreciated is that the data subsequently stored in state 602 differs significantly from the data previously stored in state 602. An advantageous feature of the shifting described above is that least-recently generated bits of state 602 are discarded to promote perpetual significant change in state 602.

Pseudo-random sequence generator 204 therefore produces a stream of pseudo-random bits which are reproducible and which do not repeat for an extremely large number of bits. In addition, the pseudo-random bit stream can continue indefinitely and is therefore particularly suitable for encoding watermark data in very long digitized signals such as long tracks of audio or long motion video signals. Chipper 206 (FIG. 2) of basis signal generator 102 performs spread-spectrum chipping to form a chipped noise spectrum 212. Processing by chipper 206 is illustrated by logic flow diagram 800 (FIG. 8) in which processing begins with loop step 802.

Figure 8:
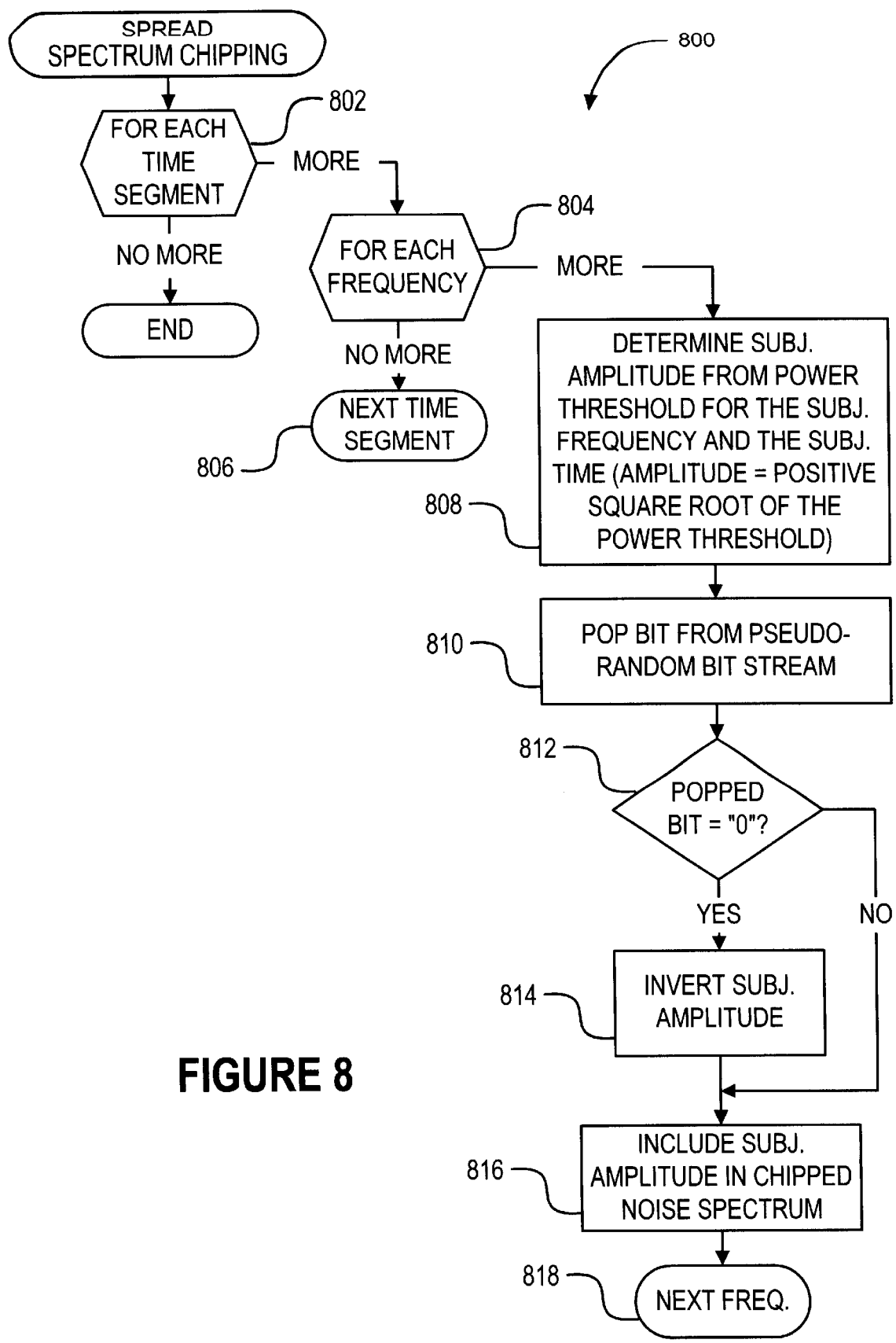
FIG. 8 is a logic flow diagram of spread-spectrum chipping as performed by the chipper of FIG. 2.

Loop step 802 and next step 806 define a loop in which chipper 206 (FIG. 2) processes each time segment represented within noise threshold spectrum 210 according to steps 804–818 (FIG. 8). During each iteration of the loop of steps 802–806, the particular time segment processed is referred to as the subject time segment. For each time segment, processing transfers from loop step 802 to loop step 804.

Loop step 804 and next step 818 define a loop in which chipper 206 (FIG. 2) processes each frequency represented within noise threshold spectrum 210 for the subject time segment according to steps 808–816 (FIG. 8). During each iteration of the loop of steps 804–818, the particular frequency processed is referred to as the subject frequency. For each frequency, processing transfers from loop step 804 to step 808.

In step 808, chipper 206 (FIG. 2) retrieves data representing the subject frequency at the subject time segment from noise threshold spectrum 210 and converts the energy to a corresponding amplitude. For example, chipper 206 calculates the amplitude as the positive square root of the individual noise threshold.

In step 810 (FIG. 8), chipper 206 (FIG. 2) pops a bit from the pseudo-random bit stream received by chipper 206 from pseudo-random bit stream generator 204. Chipper 206 determines whether the popped bit represents a specific, predetermined logical value, e.g., zero, in step 812 (FIG. 8). If so, processing transfers to step 814. Otherwise, step 814 is skipped. In step 814, chipper 206 (FIG. 2) inverts the amplitude determined in step 808 (FIG. 8). Inversion of amplitude of a sample of a digital signal is known and is not described herein further. Thus, if the popped bit represents a logical zero, the amplitude is inverted. Otherwise, the amplitude is not inverted.

In step 816 (FIG. 8), the amplitude, whether inverted in step 814 or not inverted by skipping step 814 in the manner described above, is included in chipped noise spectrum 212 (FIG. 2). After step 816 (FIG. 8), processing transfers through next step 818 to loop step 804 in which another frequency is processed in the manner described above. Once all frequencies of the subject time segment have been processed, processing transfers through next step 806 to loop step 802 in which the next time segment is processed. After all time segments have been processed, processing according to logic flow diagram 800 completes.

Basis signal generator 102 (FIG. 2) includes a filter bank 208 which receives chipped noise spectrum 212. Filter band 208 performs a transformation, which is the inverse of the transformation performed by sub-band filter bank 402 (FIG. 4), to produce basis signal 112 in the form of amplitude samples over time. Due to the chipping using the pseudo-random bit stream in the manner described above, basis signal 112 is unlikely to correlate closely with the substantive content of audio signal 110 (FIG. 1), or any other signal which is not based on the same pseudo-random bit stream for that matter. In addition, since basis signal 112 has amplitudes no larger than those specified limited by noise threshold spectrum 210, a signal having no more than the amplitudes of basis signal 112 can be added to audio signal 110 (FIG. 1) without perceptibly affecting the substantive content of audio signal 110.

Figure 9:
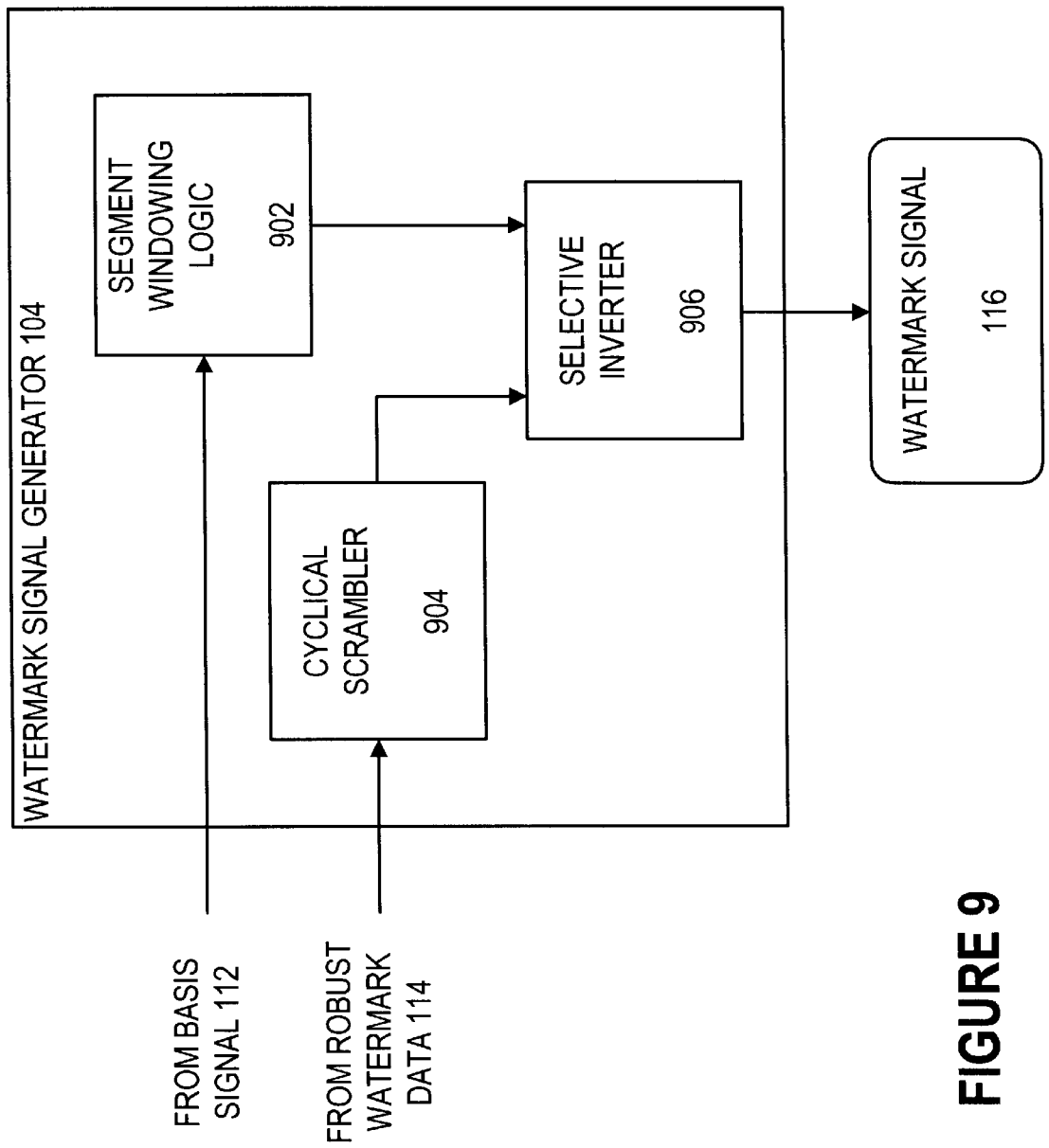
FIG. 9 is a block diagram of the watermark signal generator of FIG. 1.

Watermark signal generator 104 of watermarker 100 combines basis signal 112 with robust watermark data 114 to form watermark signal 116. Robust watermark data 114 is described more completely below. The combination of basis signal 112 with robust watermark data 114 is relatively simple, such that most of the complexity of watermarker 100 is used to form basis signal 112. One advantage of having most of the complexity in producing basis signal 112 is described more completely below with respect to detecting watermarks in digitized signals in which samples have been added to or removed from the beginning of the signal. Watermark signal generator 104 is shown in greater detail in FIG. 9.

Watermark signal generator 104 includes segment windowing logic 902 which provides for soft transitions in watermark signal 116 at encoded bit boundaries. Each bit of robust watermark data 114 is encoded in a segment of basis signal 112. Each segment is a portion of time of basis signal 112 which includes a number of samples of basis signal 112. In one embodiment, each segment has a length of 4,096 contiguous samples of an audio signal whose sampling rate is 44,100 Hz and therefore covers approximately one-tenth of a second of audio data. A change from a bit of robust watermark data 114 of a logic value of zero to a next bit of a logical value of one can cause an amplitude swing of twice that specified in noise threshold spectrum 210 (FIG. 2) for the corresponding portion of audio signal 110 (FIG. 1). Accordingly, segment windowing logic 902 (FIG. 9) dampens basis signal 112 at segment boundaries so as to provide a smooth transition from full amplitude at centers of segments to zero amplitude at segment boundaries. The transition from segment centers to segment boundaries of the segment filter is sufficiently smooth to eliminate perceptible amplitude transitions in watermark signal 116 at segment boundaries and is sufficiently sharp that the energy of watermark signal 116 within each segment is sufficient to enable reliable detection and decoding of watermark signal 116.

Figure 17A:
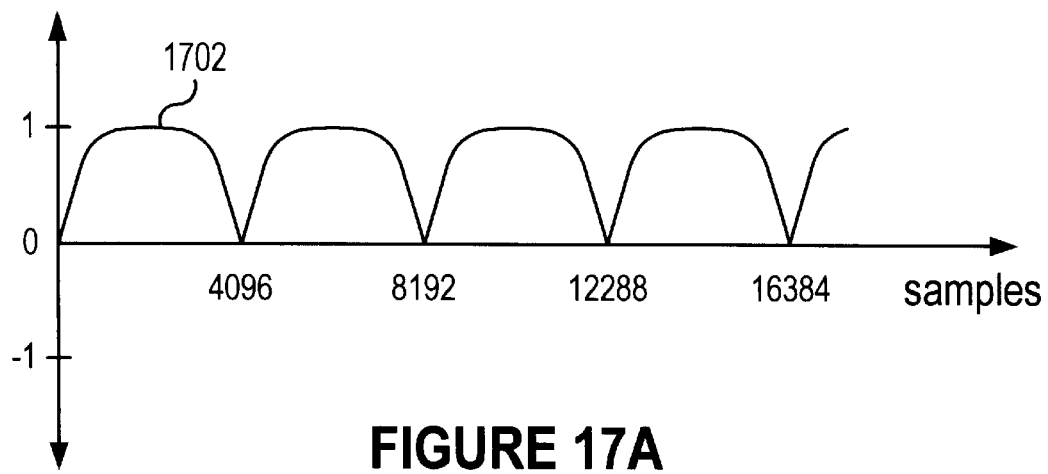
FIGS. 17A–C are graphs illustrating the processing of segment windowing logic of FIG. 14.
Figure 17B:
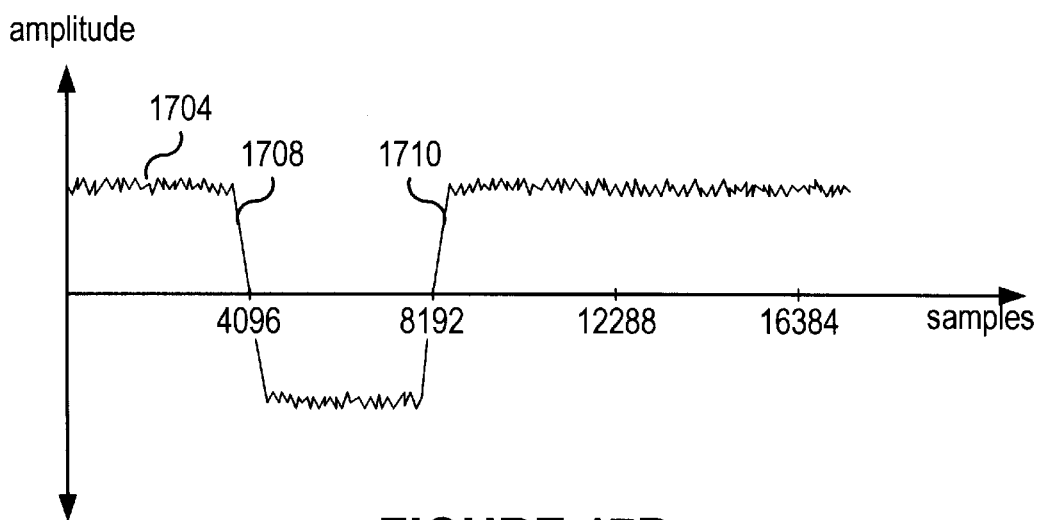
Figure 17C:
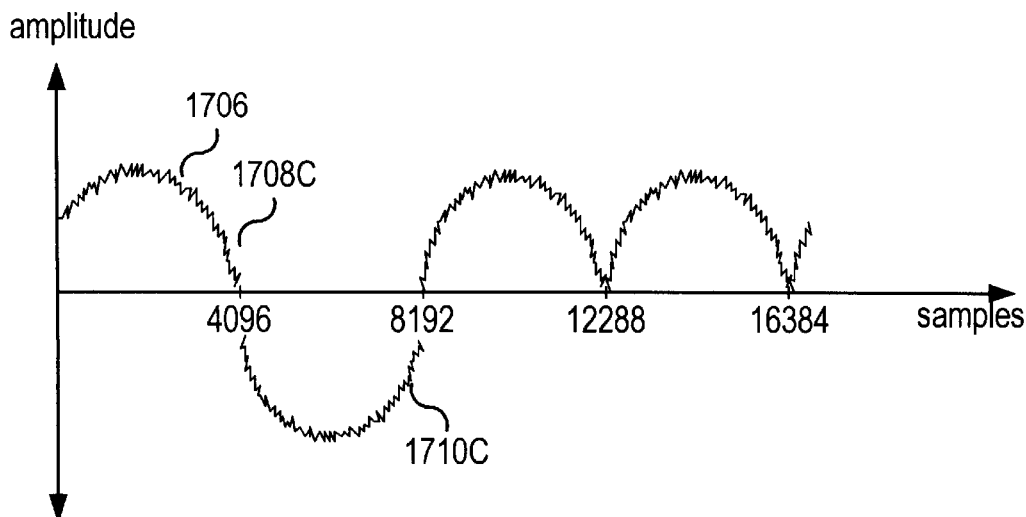

In one embodiment, the segment windowing logic 902 dampens segment boundaries of basis signal 112 by multiplying samples of basis signal 112 by a function 1702 (FIG. 17A) which is a cube-root of the first, non-negative half of a sine-wave. The length of the sine-wave of function 1702 is adjusted to coincide with segment boundaries. FIG. 17B shows an illustrative representation 1704 of basis signal 112 prior to processing by segment windowing logic 902 (FIG. 9) in which sharp transitions 1708 (FIG. 17B) and 1710 and potentially perceptible to a human listener. Multiplication of function 1702 with representation 1704 results in a smoothed basis signal as shown in FIG. 17C as representation 1706. Transitions 1708C and 1710C are smoother and less perceptible than are transitions 1708 (FIG. 17B) and 1710.

Figure 10:
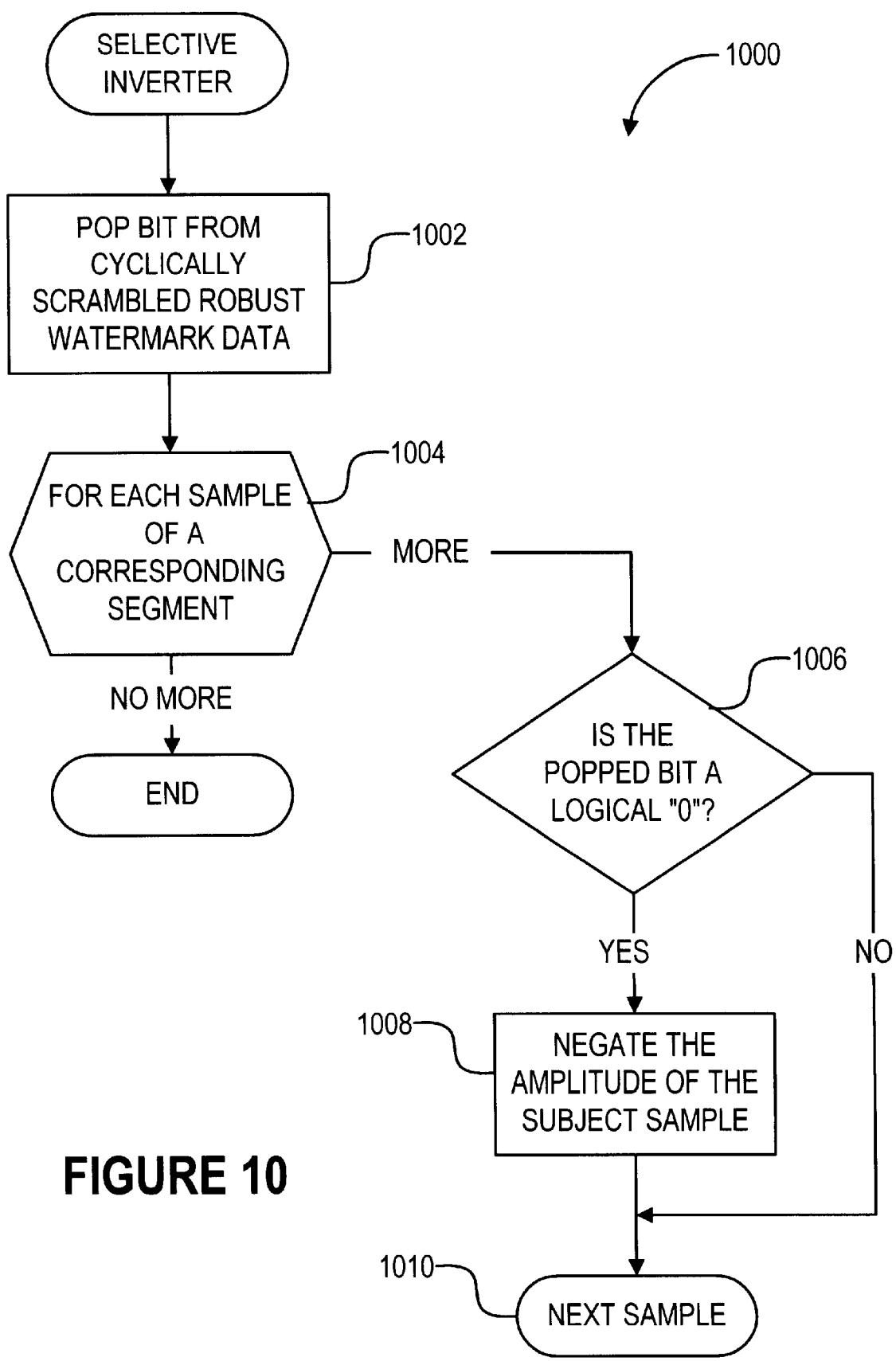
FIG. 10 is a logic flow diagram of the processing of a selective inverter of FIG. 9.

Basis signal 112, after processing by segment windowing logic 902 (FIG. 9), is passed from segment windowing logic 902 to selective inverter 906. Selective inverter 906 also receives bits of robust watermark data 114 in a scrambled order from cyclical scrambler 904 which is described in greater detail below. Processing by selective inverter 906 is illustrated by logic flow diagram 1000 (FIG. 10) in which processing begins with step 1002.

In step 1002, selective inverter 906 (FIG. 9) pops a bit from the scrambled robust watermark data. Loop step 1004 (FIG. 10) and next step 1010 define a loop within which selective inverter 906 (FIG. 9) processes each of the samples of a corresponding segment of the segment filtered basis signal received from segment windowing logic 902 according to steps 1006–1008. For each sample of the corresponding segment, processing transfers from loop step 1004 to test step 1006. During an iteration of the loop of steps 1004–1010, the particular sample processed is referred to as the subject sample.

In test step 1006, selective inverter 906 (FIG. 9) determines whether the popped bit represents a predetermined logical value, e.g., zero. If the popped bit represents a logical zero, processing transfers from test step 1008 (FIG. 10) and therefrom to next step 1010. Otherwise, processing transfers from loop step 1006 directly to next step 1010 and step 1008 is skipped.

In step 1008, selective inverter 906 (FIG. 9) negates the amplitude of the subject sample. From next step 1010, processing transfers to loop step 1004 in which the next sample of the corresponding segment is processing according to the loop of steps 1004–1010. Thus, if the popped bit represents a logical zero, all samples of the corresponding segment of the segment-filtered basis signal are negated. Conversely, if the popped bit represents a logical one, all samples of the corresponding segment of the segment-filtered basis signal remain unchanged.

When all samples of the corresponding segment have been processed according to the loop of steps 1004–1010, processing according to logic flow diagram 1000 is completed. Each bit of the scrambled robust watermark data is processed by selective inverter 906 (FIG. 9) according to logic flow diagram 1000. When all bits of the scrambled robust watermark data have been processed, all bits of a subsequent instance of scrambled robust watermark data are processed in the same manner. The result of such processing is stored as watermark signal 116. Accordingly, watermark signal 116 includes repeated encoded instances of robust watermark data 114.

As described above, each repeated instance of robust watermark data 114 is scrambled. It is possible that the substantive content of audio signal 110 (FIG. 1) has a rhythmic transient characteristic such that transients occur at regular intervals or that the substantive content includes long and/or rhythmic occurrences of silence. As described above, transient damper 308 (FIG. 3) suppresses basis signal 112 at places corresponding to transients. In addition, noise threshold spectrum 306 has very low noise thresholds, perhaps corresponding to an noise threshold amplitude of zero, at places corresponding to silence or near silence in the substantive content of audio signal 110 (FIG. 1). Such transients and/or silence can be synchronized within the substantive content of audio signal 110 with repeated instances of robust watermark data 114 such that the same portion of robust watermark data 114 is removed from watermark signal 116 by operation of transient damper 308 (FIG. 3) or by near zero noise thresholds in basis signal 112. Accordingly, the same portion of robust watermark data 114 (FIG. 1) is missing from the entirety of watermark signal 116 notwithstanding numerous instances of robust watermark data 114 encoded in watermark signal 116.

Therefore, cyclical scrambler 904 (FIG. 9) scrambles the order of each instance of robust watermark data 114 such that each bit of robust watermark data 114 is encoded within watermark signal 116 at non-regular intervals. For example, the first bit of robust watermark data 114 can be encoded as the fourth bit in the first instance of robust watermark data 114 in watermark signal 116, as the eighteenth bit in the next instance of robust watermark data 114 in watermark signal 116, as the seventh bit in the next instance of robust watermark data 114 in watermark signal 116, and so on. Accordingly, it is highly unlikely that every instance of any particular bit or bits of robust watermark data 114 as encoded in watermark signal 116 is removed by dampening of watermark signal 116 at transients of audio signal 110 (FIG. 1).

Figure 11:
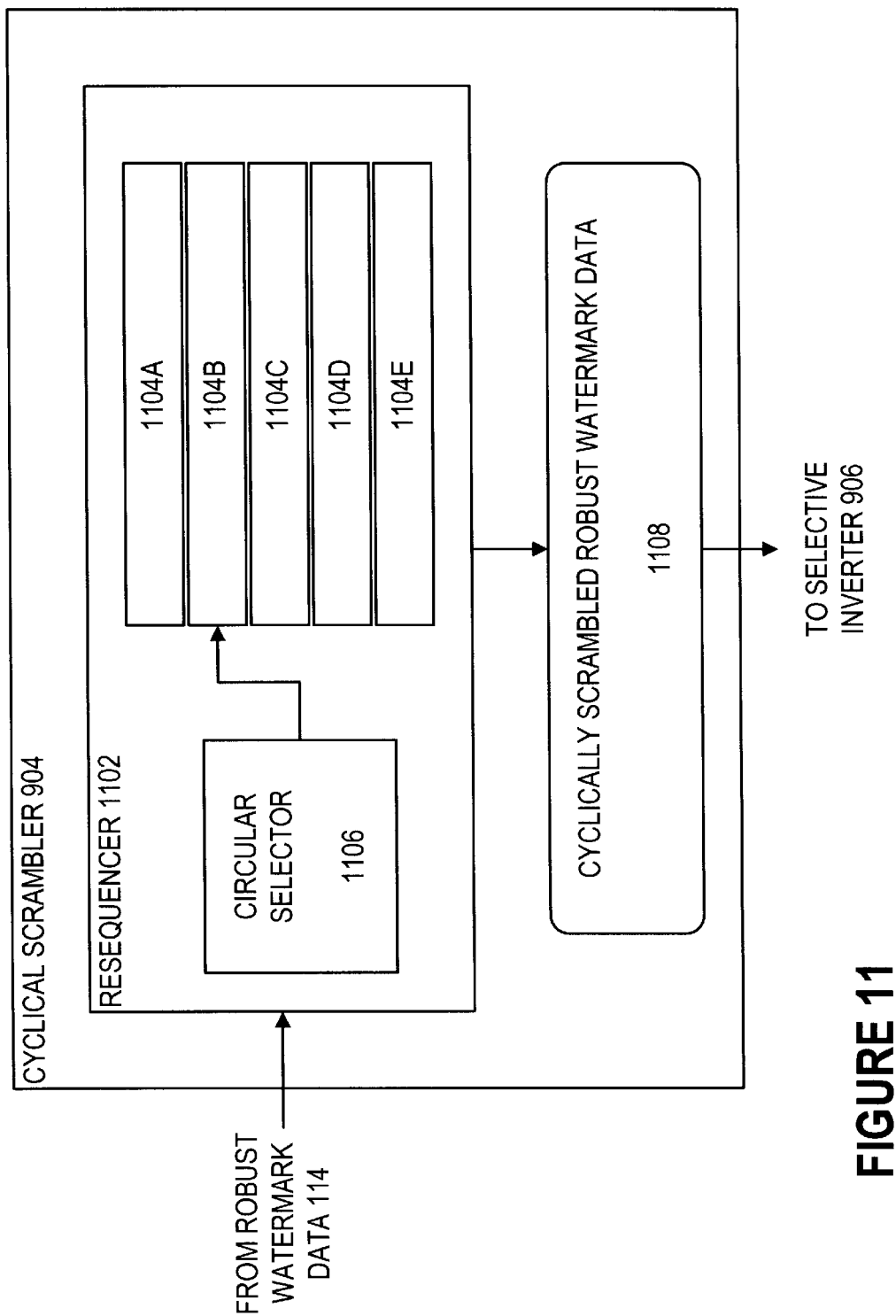
FIG. 11 is a block diagram of a cyclical scrambler of FIG. 9.

Cyclical scrambler 904 (FIG. 9) is shown in greater detail in FIG. 11. Cyclical scrambler 904 includes a resequencer 1102 which receives robust watermark data 114, reorders the bits of robust watermark data 114 to form cyclically scrambled robust watermark data 1108, and supplies cyclically scrambled robust watermark data 1108 to selective inverter 906. Cyclically scrambled robust watermark data 1108 includes one representation of every individual bit of robust watermark data 114; however, the order of such bits is scrambled in a predetermined order.

Resequencer 1102 includes a number of bit sequences 1104A–E, each of which specifies a different respective scrambled bit order of robust watermark data 114. For example, bit sequence 1104A can specify that the first bit of cyclically scrambled robust watermark data 1108 is the fourteenth bit of robust watermark data 114, that the second bit of cyclically scrambled robust watermark data 1108 is the eighth bit of robust watermark data 114, and so on. Resequencer 1102 also includes a circular selector 1106 which selects one of bit sequences 1104A–E. Initially, circular selector 1106 selects bit sequence 1104A. Resequencer 1102 copies individual bits of robust watermark data 114 into cyclically scrambled robust watermark data 1108 in the order specified by the selected one of bit sequences 1104A–E as specified by circular selector 1106.

After robust watermark data 114 has been so scrambled, circular selector 1106 advances to select the next of bit sequences 1104A–E. For example, after resequencing the bits of robust watermark data 114 according to bit sequence 1104A, circular selector 1106 advances to select bit sequence 1104B for subsequently resequencing the bits of robust watermark data 114. Circular selector 1106 advances in a circular fashion such that advancing after selecting bit sequence 1104E selects bit sequence 1104A. While resequencer 1102 is shown to include five bit sequences 1104A–E, resequencer 1102 can include generally any number of such bit sequences.

Thus, cyclical scrambler 904 sends many instances of robust watermark data 114 to selective inverter 906 with the order of the bits of each instance of robust watermark data 114 scrambled in a predetermined manner according to respective ones of bit sequences 1104A–E. Accordingly, each bit of robust watermark data 114, as received by selective inverter 906, does not appear in watermark signal 116 (FIG. 9) in regularly spaced intervals. Accordingly, rhythmic transients in audio signal 110 (FIG. 1) are very unlikely to dampen representation of each and every representation of a particular bit of robust watermark data 114 in watermark signal 116.

Watermarker 100 includes a signal adder 106 which adds watermark signal 116 to audio signal 110 to form watermarked audio signal 120. To a human listener, watermarked audio signal 120 should be indistinguishable from audio signal 110. However, watermarked audio signal 120 includes watermark signal 116 which can be detected and decoded within an audio signal in the manner described more completely below to identify watermarked audio signal 120 as the origin of the audio signal.

Robust Watermark Data

As described above, robust watermark data 114 can survive substantial adversity such as certain types of signal processing of watermarked audio signal 120 and relatively extreme dynamic characteristics of audio signal 110. A data robustness enhancer 1204 (FIG. 12) forms robust watermark data 114 from raw watermark data 1202. Raw watermark data 1202 includes data to identify one or more characteristics of watermarked audio signal 120 (FIG. 1). In one embodiment, raw watermark data 1202 uniquely identifies a commercial transaction in which an end user purchases watermarked audio signal 120. Implicit, or alternatively explicit, in the unique identification of the transaction is unique identification of the end user purchasing watermarked audio signal 120. Accordingly, suspected copies of watermarked audio signal 120 can be verified as such by decoding raw watermark data 1202 (FIG. 12) in the manner described below.

Data robustness enhancer 1204 includes a precoder 1206 which implements a 1/(1 XOR D) precoder of raw watermark data 1202 to form inversion-robust watermark data 1210. The following source code excerpt describes an illustrative embodiment of precoder 1206 implemented using the known C computer instruction language.

```
void precode(const bool *indata, u_int32 numInBits, bool
   *outdata, u_int32 *pNumOutBits){
   // precode with 1/(1 XOR D) precoder so that precoded
      bitstream can be inverted and
   // still postdecode to the right original indata
   // this preceding will generate 1 extra bit
   u_int32 i;
   bool state=0;
   *pNumOutBits=0;
   outdata[(*pNumOutBits)++]=state;
   for (i=0; i<numInBits; i++){
      state=state ^ indata[i];
      outdata[(*pNumOutBits)++]=state;
   {
}
```

It should be noted that simple inversion of an audio signal, i.e., negation of each individual amplitude of the audio signal, results in an equivalent audio signal. The resulting audio signal is equivalent since, when presented to a human listener through a loudspeaker, the resulting inverted signal is indistinguishable from the original audio signal. However, inversion of each bit of watermark data can render the watermark data meaningless.

As a result of 1/(1 XOR D) precoding by precoder 1206, decoding of inversion-robust watermark data 1210 results in raw watermark data 1202 regardless of whether inversion-robust data 1210 has been inverted. Inversion of watermarked audio signal 120 (FIG. 1) therefore has no effect on the detectability or readability of the watermark included in watermarked audio signal 120 (FIG. 1).

Figure 16:
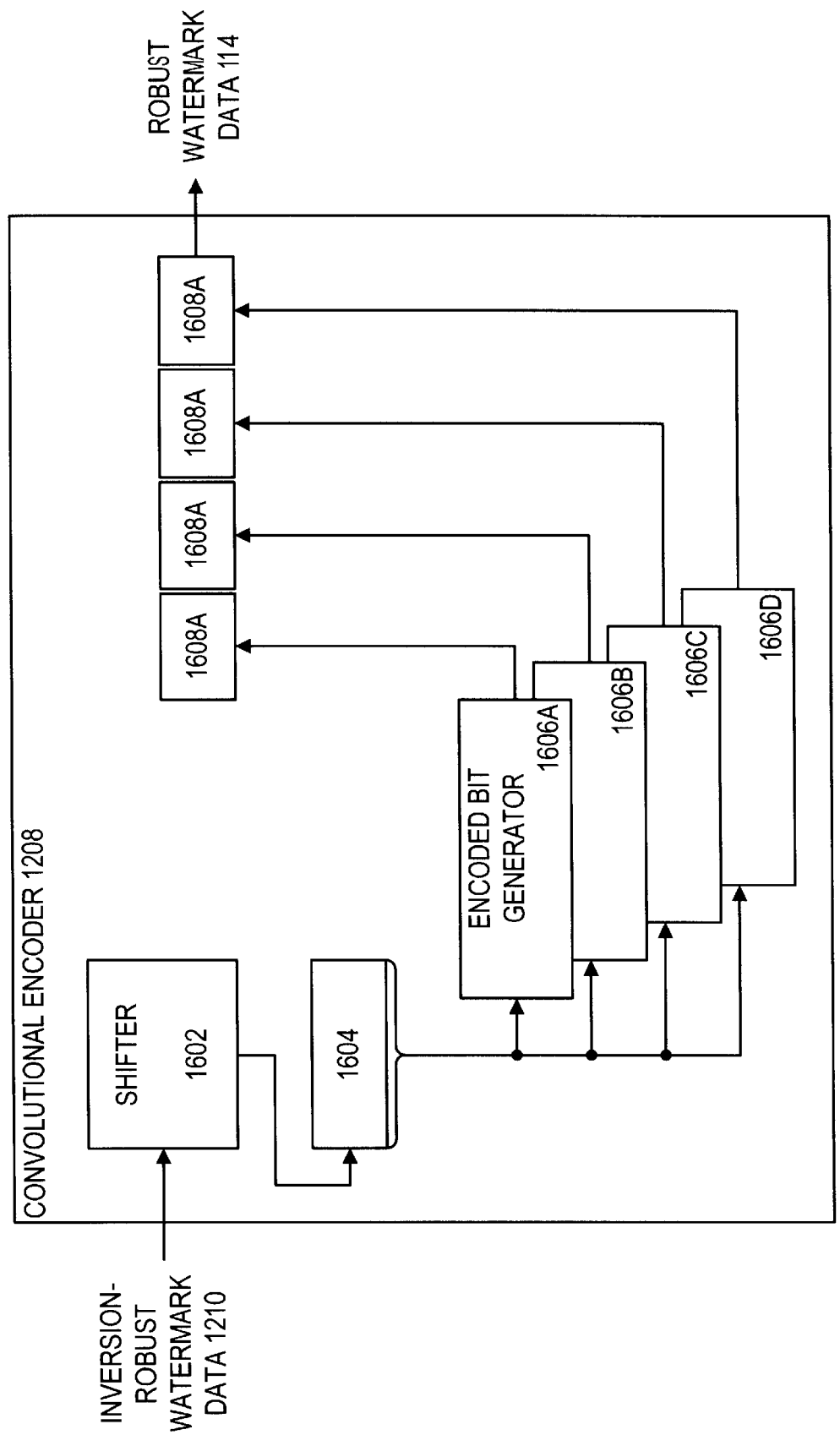
FIG. 16 is a block diagram of a convolutional encoder of FIG. 15.

Data robustness enhancer 1204 (FIG. 12) also includes a convolutional encoder 1208 which performs convolutional encoding upon inversion-robust watermark data 1210 to form robust watermark data 114. Convolutional encoder 1208 is shown in greater detail in FIG. 16.

Convolutional encoder 1208 includes a shifter 1602 which retrieves bits of inversion-robust watermark data 1210 and shifts the retrieved bits into a register 1604. Register 1604 can alternatively be implemented as a data word within a general purpose computer-readable memory. Shifter 1602 accesses inversion-robust watermark data 1210 in a circular fashion as described more completely below. Initially, shifter 1602 shifts bits of inversion-robust watermark data 1210 into register 1604 until register 1604 is full with least significant bits of inversion-robust watermark data 1210.

Convolutional encoder 1208 includes a number of encoded bit generators 1606A–D, each of which processes the bits stored in register 1604 to form a respective one of encoded bits 1608A–D. Thus, register 1604 stores at least enough bits to provide a requisite number of bits to the longest of encoded bit generators 1606A–D and, initially, that number of bits is shifted into register 1604 from inversion-robust watermark data 1210 by shifter 1602. Each of encoded bit generators 1606A–D applies a different, respective filter to the bits of register 1604 the result of which is the respective one of encoded bits 1608A–D. Encoded bit generators 1606A–D are selected such that the least significant bit of register 1604 can be deduced from encoded bits 1608A–D. Of course, while four encoded bit generators 1606A–D are described in this illustrative embodiment, more or fewer encoded bit generators can be used.

Figure 18:
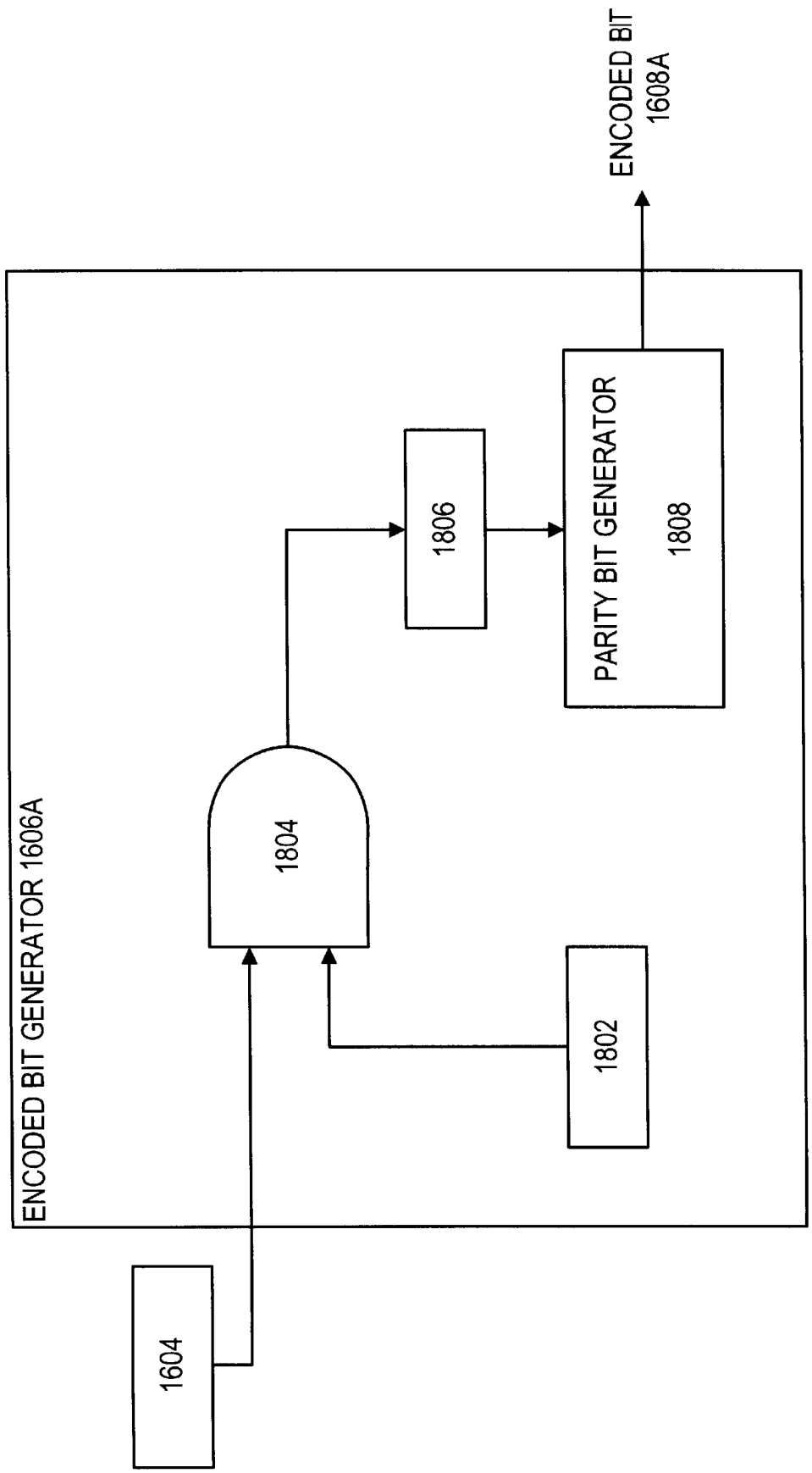
FIG. 18 is a block diagram of a encoded bit generator of the convolutional encoder of FIG. 16.

Encoded bit generators 1606A–D are directly analogous to one another and the following description of encoded bit generator 1606A, which is shown in greater detail in FIG. 18, is equally applicable to each of encoded bit generators 1606B–D. Encoded bit generator 1606A includes a bit pattern 1802 and an AND gate 1804 which performs a bitwise logical AND operation on bit pattern 1802 and register 1604. The result is stored in a register 1806. Encoded bit generator 1606A includes a parity bit generator 1808 which produces a encoded bit 1608A a parity bit from the contents of register 1806. Parity bit generator 1808 can apply either even or odd parity. The type of parity, e.g., even or odd, applied by each of encoded bit generators 1606A–D (FIG. 16) is independent of the type of parity applied by others of encoded bit generators 1606A–D.

In a preferred embodiment, the number of bits of bit pattern 1802 (FIG. 18), and analogous bit patterns of encoded bit generators 1606B–D (FIG. 16), whose logical values are one (1) is odd. Accordingly, the number of bits of register 1806 (FIG. 18) representing bits of register 1604 is similarly odd. Such ensures that inversion of encoded bit 1608A, e.g., through subsequent inversion of watermarked audio signal 120 (FIG. 1), result in decoding in the manner described more completely below to form the logical inverse of inversion-robust watermark data 1210. Of course, the logical inverse of inversion-robust watermark data 1210 decodes to provide raw watermark data 1202 as described above. Such is true since, in any odd number of binary data bits, the number of logical one bits has opposite parity of the number of logical zero bits. In other words, if an odd number of bits includes an even number of bits whose logical value is one, the bits include an odd number of bits whose logical value is zero. Conversely, if the odd number of bits includes an odd number of bits whose logical value is one, the bits include an even number of bits whose logical value is zero. Inversion of the odd number of bits effectively changes the parity of the odd number of bits. Such is not true of an even number of bits, i.e., inversion does not change the parity of an even number of bits. Accordingly, inversion of encoded bit 1608A corresponds to inversion of the data stored in register 1604 when bit pattern 1802 includes an odd number of bits whose logical value is one.

Convolutional encoder 1208 (FIG. 16) includes encoded bits 1608A–D in robust watermark data 114 as a representation of the least significant bit of register 1604. As described above, the least significant bit of register 1604 is initially the least significant bit of inversion-robust watermark data 1210. To process the next bit of inversion-robust watermark data 1210, shifter 1602 shifts another bit of inversion-robust watermark data 1210 into register 1604 and register 1604 is again processed by encoded bit generators 1606A–D. Eventually, as bits of inversion-robust watermark data 1210 are shifted into register 1604, the most significant bit of inversion-robust watermark data 1210 is shifted into the most significant bit of register 1604. Next, in shifting the most significant bit of inversion-robust data 1210 to the second most significant position within register 1604, shifter 1602 shifts the least significant bit into the most significant position within register 1604. Shifter 1602 therefore shifts inversion-robust watermark data 1210 through register 1604 in a circular fashion. After encoded bit generators 1606A–D of register 1604 when the most significant bit of inversion-robust watermark data 1210 is shifted to the least significant portion of register 1604, processing by convolutional encoder 1208 of inversion-robust watermark data 1210 is complete. Robust watermark data 114 is therefore also complete.

By using multiple encoded bits, e.g., encoded bits 1608A–D, to represent a single bit of inversion-robust watermark data 1210, e.g., the least significant bit of register 1604, convolutional encoder 1208 increases the likelihood that the single bit can be retrieved from watermarked audio signal 120 even after significant processing is performed upon watermarked audio signal 120. In addition, pseudo-random distribution of encoded bits 1608A–D (FIG. 17) within each iterative instance of robust watermark data 114 in watermarked audio signal 120 (FIG. 1) by operation of cyclical scrambler 904 (FIG. 11) further increases the likelihood that a particular bit of raw watermark data 1202 (FIG. 12) will be retrievable notwithstanding processing of watermarked audio signal 120 (FIG. 1) and somewhat extreme dynamic characteristics of audio signal 110.

It is appreciated that either precoder 1206 (FIG. 12) or convolutional encoder 1208 alone significantly enhances the robustness of raw watermark data 1202. However, the combination of precoder 1206 with convolutional encoder 1208 makes robust watermark data 114 significantly more robust than could be achieved by either precoder 1206 or convolutional encoder 1208 alone.

Decoding the Watermark

Watermarked audio signal 1310 (FIG. 13) is an audio signal which is suspected to include a watermark signal. For example, watermarked audio signal 1310 can be watermarked audio signal 120 (FIG. 1) or a copy thereof. In addition, watermarked signal 1310 (FIG. 13) may have been processed and filtered in any of a number of ways. Such processing and filtering can include (i) filtering out of certain frequencies, e.g., typically those frequencies beyond the range of human hearing, (ii) and lossy compression with subsequent decompression. While watermarked audio signal 1310 is an audio signal, watermarks can be similarly recognized in other digitized signals, e.g., still and motion video signals. It is sometimes desirable to determine the source of watermarked audio signal 1310, e.g., to determine if watermarked signal 1310 is an unauthorized copy of watermarked audio signal 120 (FIG. 1).

Watermark decoder 1300 (FIG. 13) processes watermarked audio signal 1310 to decode a watermark candidate 1314 therefrom and to produce a verification signal if watermark candidate 1314 is equivalent to preselected watermark data of interest. Specifically, watermark decoder 1300 includes a basis signal generator 1302 which generates a basis signal 1312 from watermarked data 1310 in the manner described above with respect to basis signal 112 (FIG. 1). While basis signal 1312 (FIG. 13) is derived from watermarked audio signal 1310 which differs somewhat from audio signal 110 (FIG. 1) from which basis signal 112 is derived, audio signal 110 and watermarked audio signal 1310 (FIG. 13) are sufficiently similar to one another that basis signals 1312 and 112 (FIG. 1) should be very similar. If audio signal 110 and watermarked audio signal 1310 (FIG. 13) are sufficiently different from one another that basis signals 1312 and 112 (FIG. 1) are substantially different from one another, it is highly likely that the substantive content of watermarked audio signal 1310 (FIG. 13) differs substantially and perceptibly from the substantive content of audio signal 110 (FIG. 1). Accordingly, it would be highly unlikely that audio signal 110 is the source of watermarked audio signal 1310 (FIG. 13) if basis signal 1302 differed substantially from basis signal 112 (FIG. 1).

Watermark decoder 1300 (FIG. 13) includes a correlator 1304 which uses basis signal 1312 to extract watermark candidate 1314 from watermarked audio signal 1310. Correlator 1304 is shown in greater detail in FIG. 14.

Correlator 1304 includes segment windowing logic 1402 which is directly analogous to segment windowing logic 902 (FIG. 9) as described above. Segment windowing logic 1402 (FIG. 14) forms segmented basis signal 1410 which is generally equivalent to basis signal 1310 except that segmented basis signal 1410 is smoothly dampened at boundaries between segments representing respective bits of potential watermark data.

Segment collector 1404 of correlator 1304 receives segmented basis signal 1410 and watermarked audio signal 1310. Segment collector 1404 groups segments of segmented basis signal 1410 and of watermarked audio signal 1310 according to watermark data bit. As described above, numerous instances of robust watermark data 114 (FIG. 9) are included in watermark signal 116 and each instance has a scrambled bit order as determined by cyclical scrambler 904. Correlator 1304 (FIG. 14) includes a cyclical scrambler 1406 which is directly analogous to cyclical scrambler 904 (FIG. 9) and replicates precisely the same scrambled bit orders produced by cyclical scrambler. In addition, cyclical scrambler 1406 (FIG. 14) sends data specifying scrambled bit orders for each instance of expected watermark data to segment collector 1404. In this illustrative embodiment, both cyclical scramblers 904 and 1406 assume that robust watermark data 114 has a predetermined, fixed length, e.g., 516 bits. In particular, raw watermark data 1202 (FIG. 12) has a length of 128 bits, inversion-robust watermark data 1210 includes an additional bit and therefore has a length of 129 bits, and robust watermark data 114 includes four convolved bits for each bit of inversion-robust watermark data 1210 and therefore has a length of 516 bits. By using the scrambled bit orders provided by cyclical scrambler 1406 (FIG. 14), segment collector 1404 is able to determine to which bit of the expected robust watermark data each segment of segmented basis signal 1401 and of watermarked audio signal 1310 corresponds.

For each bit of the expected robust watermark data, segment collector 1404 groups all corresponding segments of segmented basis signal 1401 and of watermarked audio signal 1310 into basis signal segment database 1412 and audio signal segment database 1414, respectively. For example, basis signal segment database 1412 includes all segments of segmented basis signal 1410 corresponding to the first bit of the expected robust watermark data grouped together, all segments of segmented basis signal 1410 corresponding to the second bit of the expected robust watermark data grouped together, and so on. Similarly, audio signal segment database 1414 includes all segments of watermarked audio signal 1310 corresponding to the first bit of the expected robust watermark data grouped together, all segments of watermarked audio signal 1310 corresponding to the second bit of the expected robust watermark data grouped together, and so on.

Correlator 1304 includes a segment evaluator 1408 which determines a probability that each bit of the expected robust watermark data is a predetermined logical value according to the grouped segments of basis signal segment database 1412 and of audio signal segment database 1414. Processing by segment evaluator 1408 is illustrated by logic flow diagram 1900 (FIG. 19) in which processing begins with loop step 1902. Loop step 1902 and next step 1912 define a loop in which each bit of expected robust watermark data is processed according to steps 1904–1910. During each iteration of the loop of steps 1902–1912, the particular bit of the expected robust watermark data is referred to as the subject bit. For each such bit, processing transfers from loop step 1902 to step 1904.

In step 1904 (FIG. 19), segment evaluator 1408 (FIG. 14) correlates corresponding segments of watermarked audio signal 1310 and segmented basis signal 1410 for the subject bit as stored in audio signal segment database 1414 and basis signal segment database 1412, respectively. Specifically, segment evaluator 1408 accumulates the products of the corresponding pairs of segments from audio signal segment database 1414 and basis signal segment database 1412 which correspond to the subject bit. In step 1906 (FIG. 19), segment evaluator 1408 (FIG. 14) self-correlates segments of segmented basis signal 1410 for the subject bit as stored in basis signal segment database 1412. As used herein, self-correlation of the segments refers to correlation of the segment with themselves. Specifically, segment evaluator 1408 accumulates the squares of the corresponding segments from basis signal segment database 1412 which correspond to the subject bit. In step 1908 (FIG. 19), segment evaluator 1408 (FIG. 14) determines the ratio of the correlation determined in step 1904 (FIG. 19) to the self-correlation determined in step 1906.

Figure 19:
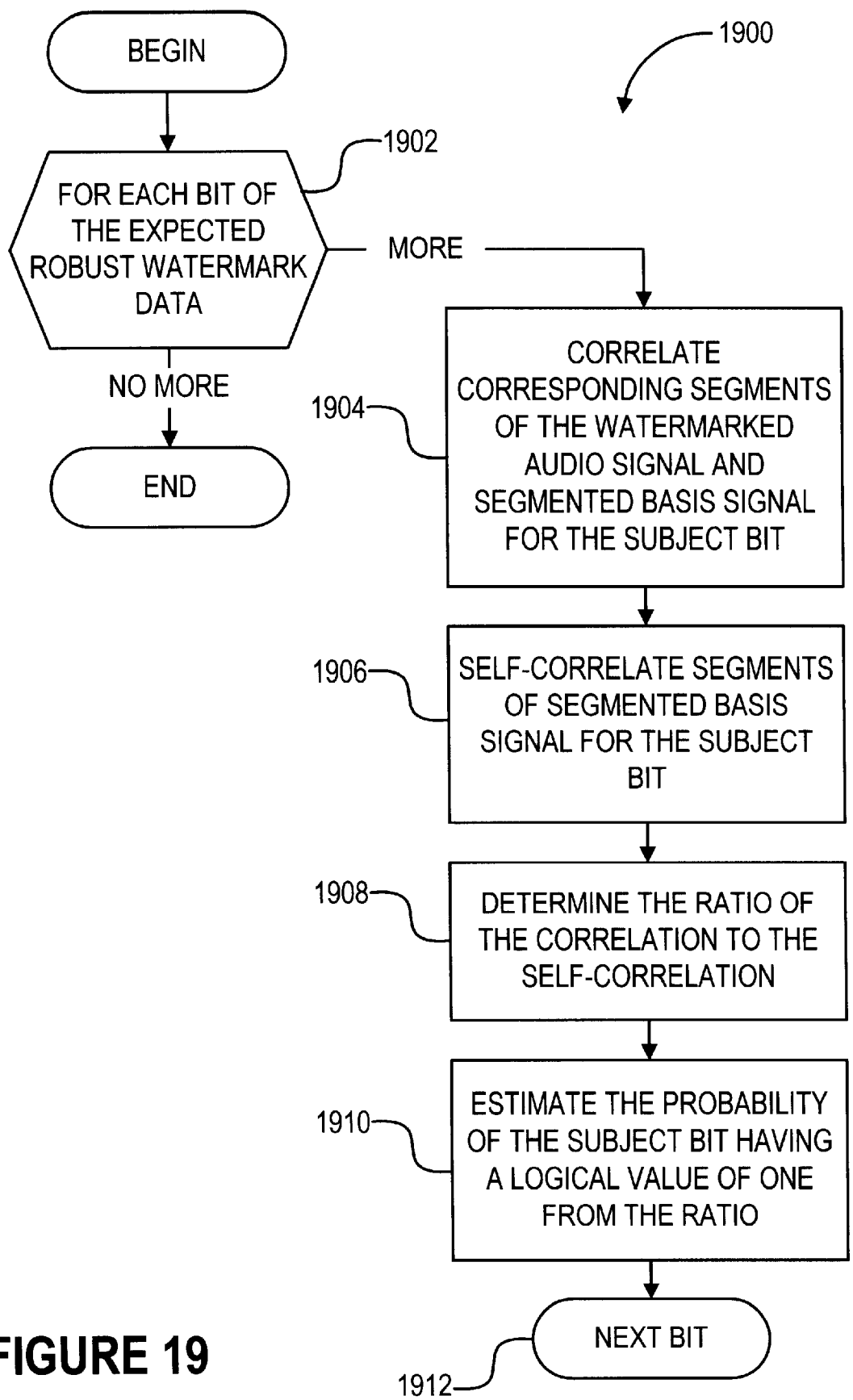
FIG. 19 is a logic flow diagram of the processing of the comparison logic of FIG. 15.

In step 1910, segment evaluator 1408 (FIG. 14) estimates the probability of the subject bit having a logic value of one from the ratio determined in step 1908 (FIG. 19). In estimating this probability, segment evaluator 1408 (FIG. 14) is designed in accordance with some assumptions regarding noise which may have been introduced to watermarked audio signal 1310 subsequent to inclusion of a watermark signal. Specifically, it is assumed that the only noise added to watermarked audio signal 1310 since watermarking is a result of lossy compression using sub-band encoding which is similar to the manner in which basis signal 112 (FIG. 1) is generated in the manner described above. Accordingly, it is further assumed that the power spectrum of such added noise is proportional to the basis signal used to generate any included watermark, e.g., basis signal 112. These assumptions are helpful at least in part because the assumption implicitly assume a strong correlation between added noise and any included watermark signal and therefore represent a worst-case occurrence. Accounting for such a worst-case occurrence enhances the robustness with which any included watermark is detected and decoded properly.

Based on these assumptions, segment evaluator 1408 (FIG. 14) estimates the probability of the subject bit having a logical value of one according to the following equation:

$$P_{one} = \frac{\left(1 + \tanh\left(\frac{R}{K}\right)\right)}{2} \quad (2)$$

In equation (2), $P_{one}$ is the probability that the subject bit has a logical value of one. Of course, the probability that the subject bit has a logical value of zero is $1-P_{one}$. R is the ratio determined in step 1908 (FIG. 19). K is a predetermined constant which is directly related to the proportionality of the power spectra of the added noise and the basis signal of any included watermark. A typical value for K can be one (1). The function tanh( ) is the hyperbolic tangent function.

Segment evaluator 1408 (FIG. 14) represents the estimated probability that the subject bit has a logical value of one in a watermark candidate 1314. Since watermark candidate 1314 is decoded using a Viterbi decoder as described below, the estimated probability is represented in watermark candidate 1314 by storing in watermark candidate 1314 the natural logarithm of the estimated probability.

After step 1910 (FIG. 19), processing transfers through next step 1912 to loop step 1902 in which the next bit of the expected robust watermark data is processed according to steps 1904–1910. When all bits of the expected robust watermark data have been processed according to the loop of steps 1902–1912, processing according to logic flow diagram 1900 completes and watermark candidate 1314 (FIG. 14) stores natural logarithms of estimated probabilities which represent respective bits of potential robust watermark data corresponding to robust watermark data 114 (FIG. 1).

Figure 15:
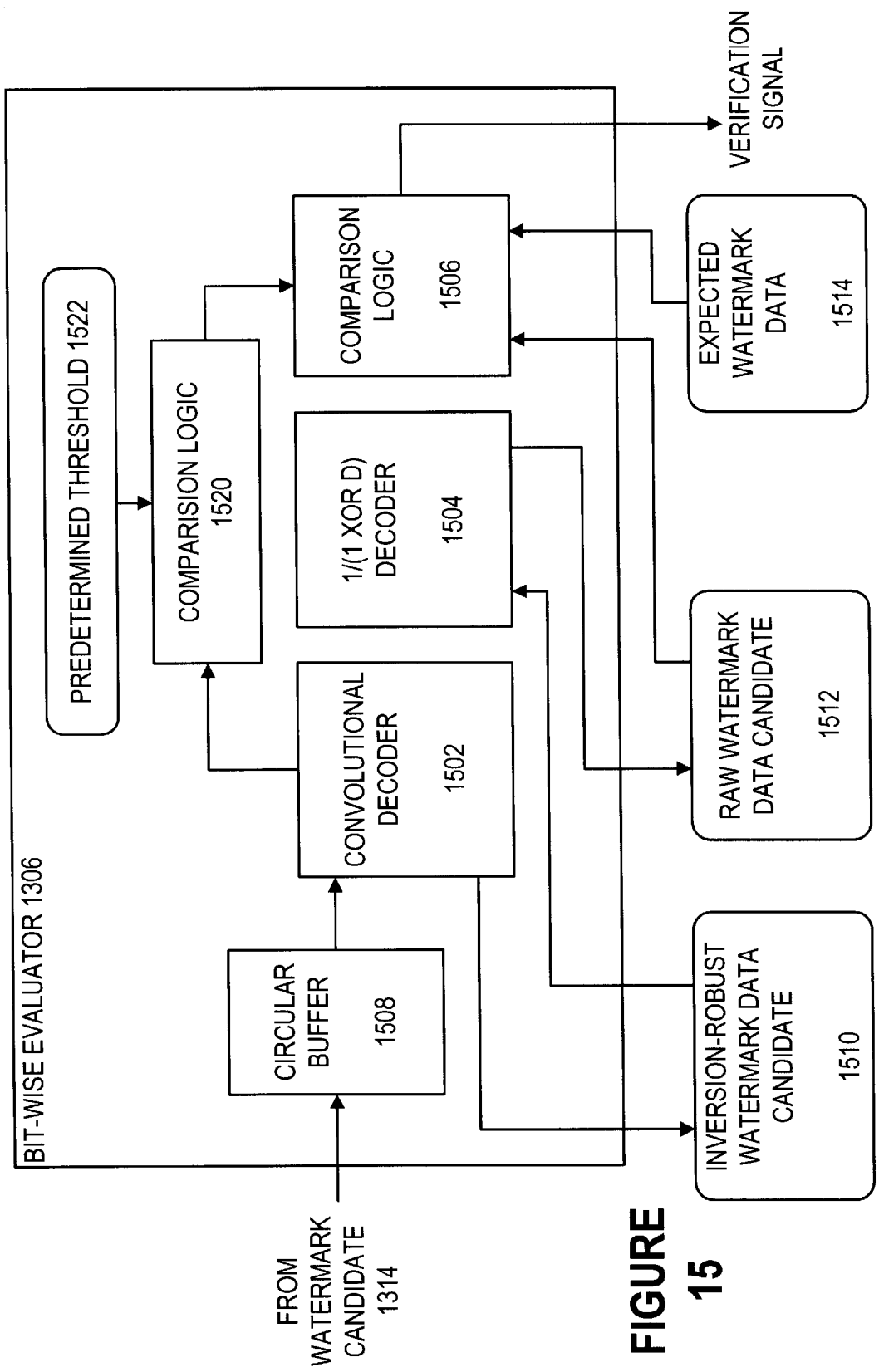
FIG. 15 is a block diagram of a bit-wise evaluator of FIG. 13.

Watermark decoder 1300 (FIG. 13) includes a bit-wise evaluator 1306 which determines whether watermark candidate 1314 represents watermark data at all and can determine whether watermark candidate 1314 is equivalent to expected watermark data 1512 (FIG. 15). Bit-wise evaluator 1306 is shown in greater detail in FIG. 15.

As shown in FIG. 15, bit-wise evaluator 1306 assumes watermark candidate 1314 represents bits of robust watermark data in the general format of robust watermark data 114 (FIG. 1) and not in a raw watermark data form, i.e., that watermark candidate 1314 assumes processing by a precoder and convolutional encoder such as precoder 1206 and convolutional encoder 1208, respectively. Bit-wise evaluator 1306 stores watermark candidate 1314 in a circular buffer 1508 and passes several iterations of watermark candidate 1314 from circular buffer 1508 to a convolutional decoder 1502. The last bit of each iteration of watermark candidate 1314 is followed by the first bit of the next iteration of watermark candidate 1314. In this illustrative embodiment, convolutional decoder 1502 is a Viterbi decoder and, as such, relies heavily on previously processed bits in interpreting current bits. Therefore, circularly presenting several iterative instances of watermark candidate 1314 to convolutional decoder 1502 enables more reliable decoding of watermark candidate 1314 by convolutional decoder 1502. Viterbi decoders are well-known and are not described herein. In addition, convolutional decoder 1502 includes bit generators which are directly analogous to encoded bit generators 1606A–D (FIG. 16) of convolutional encoder 1208 and, in this illustrative embodiment, each generate a parity bit from an odd number of bits relative to a particular bit of watermark candidate 1314 (FIG. 15) stored in circular buffer 1508.

Figure 12:
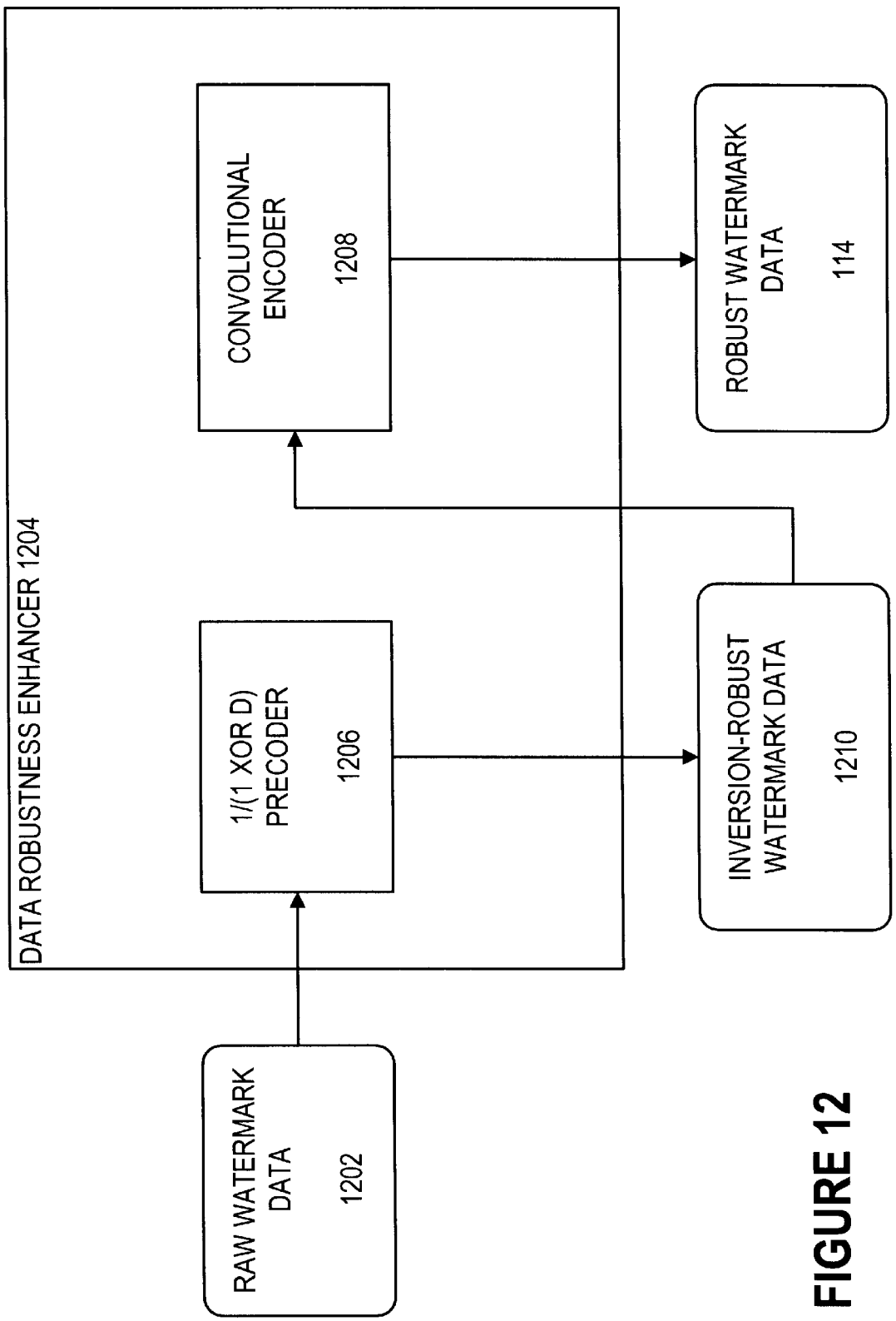
FIG. 12 is a block diagram of a data robustness enhancer used in conjunction with the watermarker of FIG. 1 in accordance with the present invention.

The result of decoding by convolutional decoder 1502 is inversion-robust watermark candidate data 1510. Such assumes, of course, that watermarked audio signal 1310 (FIG. 13) includes watermark data which was processed by a precoder such as precoder 1206 (FIG. 12). In addition, convolutional decoder 1502 produces data representing an estimation of the likelihood that watermark candidate 1314 represents a watermark at all. The data represent a log-probability that watermark candidate 1314 represents a watermark and are provided to comparison logic 1520 which compares the data to a predetermined threshold 1522. In one embodiment, predetermined threshold 1522 has a value of −1,500. If the data represent a log-probability greater than predetermined threshold 1522, comparison logic 1520 provides a signal indicating the presence of a watermark signal in watermarked audio signal 1310 (FIG. 13) to comparison logic 1506. Otherwise, comparison logic 1520 provides a signal indicating no such presence to comparison logic 1506. Comparison logic 1506 is described more completely below.

Figure 13:
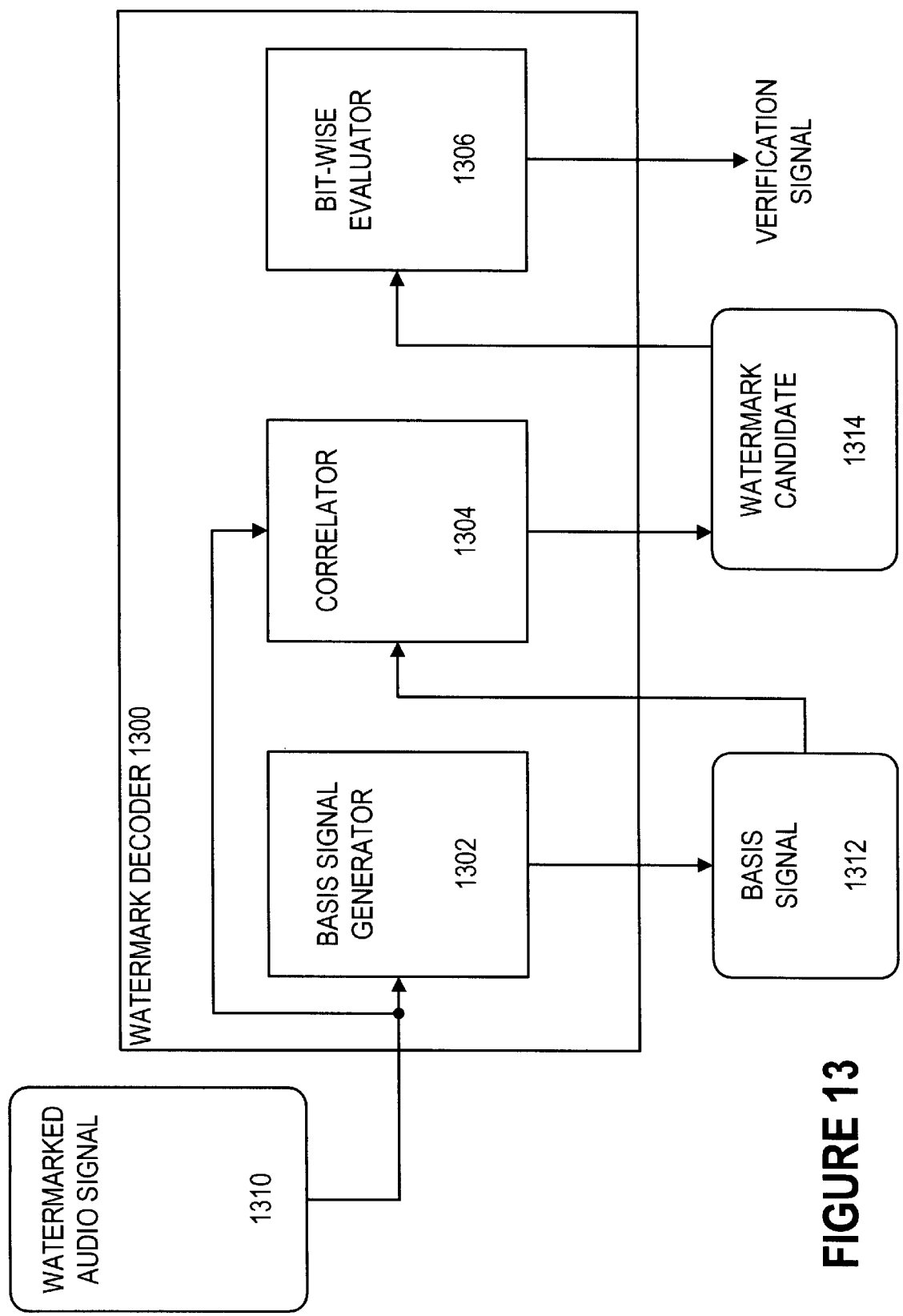
FIG. 13 is block diagram of a watermarker decoder in accordance with the present invention.
Figure 14:
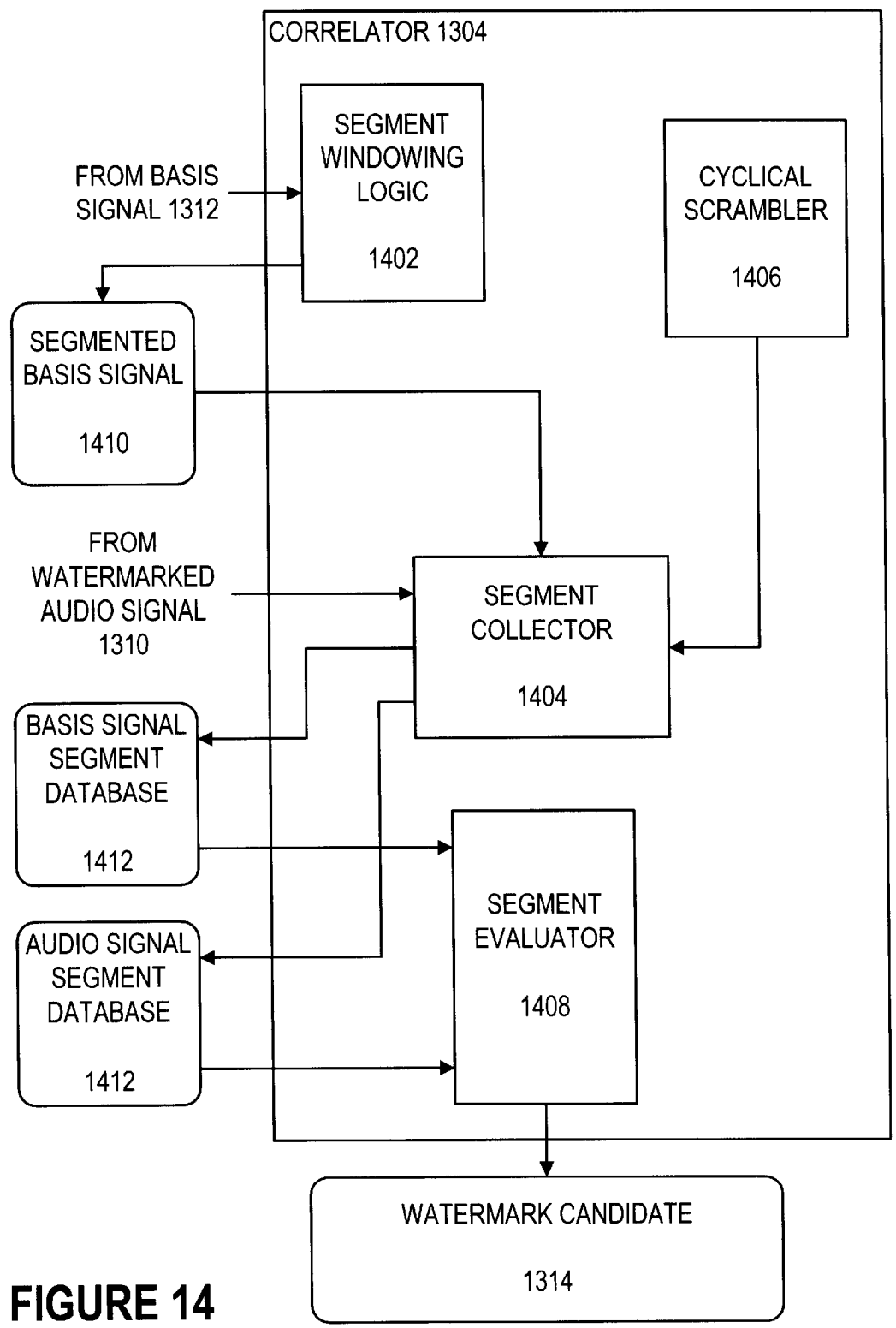
FIG. 14 is a block diagram of a correlator of FIG. 13.

Bit-wise evaluator 1306 (FIG. 15) includes a decoder 1504 which receives inversion-robust watermark data candidate 1510 and performs a 1/(1 XOR D) decoding transformation to form raw watermark data candidate 1512. Raw watermark data candidate 1512 represents the most likely watermark data included in watermarked audio signal 1310 (FIG. 13). The transformation performed by decoder 1504 (FIG. 15) is the inverse of the transformation performed by precoder 1206 (FIG. 12). As described above with respect to precoder 1206, inversion of watermarked audio signal 1310 (FIG. 13), and therefore any watermark signal included therein, results in decoding by decoder 1504 (FIG. 15) to produce the same raw watermark data candidate 1512 as would be produced absent such inversion.

The following source code excerpt describes an illustrative embodiment of decoder 1504 implemented using the known C computer instruction language.

```
void postdecode(const bool *indata, u_int32 numInBits,
  bool *outdata) {
  // postdecode with (1 XOR D) postdecoder so that
    inverted bitstream can be inverted and
  // still postdecode to the right original indata
  // this postdecoding will generate 1 less bit
  u_int32 i;
  for (i=0; i<numInBits-1; i++){
    outdata[i1=indata[i] ^ indata[i+1];
  }
}
```

In one embodiment, it is unknown beforehand what watermark, if any, is included within watermarked audio signal 1310 (FIG. 13). In this embodiment, raw watermark data candidate 1512 (FIG. 15) is presented as data representing a possible watermark included in watermarked audio signal 1310 (FIG. 13) and the signal received from comparison logic 1520 (FIG. 15) is forwarded unchanged as the verification signal of watermark decoder 1300 (FIG. 13). Display of raw watermark data candidate 1512 can reveal the source of watermarked audio signal 1310 to one moderately familiar with the type and/or format of information represented in the types of watermark which could have been included with watermarked audio signal 1310.

In another embodiment, watermarked audio signal 1310 is checked to determine whether watermarked audio signal 1310 includes a specific, known watermark as represented by expected watermark data 1514 (FIG. 15). In this latter embodiment, comparison logic 1506 receives both raw watermark data candidate 1512 and expected watermark data 1514. Comparison logic 1506 also receives data from comparison logic 1520 indicating whether any watermark at all is present within watermarked audio signal 1310. If the received data indicates no watermark is present, verification signal indicates no match between raw watermark data candidate 1512 and expected watermark data 1514. Conversely, if the received data indicates that a watermark is present within watermarked audio signal 1310, comparison logic 1506 compares raw watermark data candidate 1512 to expected watermark data 1514. If raw watermark data candidate 1512 and expected watermark data 1514 are equivalent, comparison logic 1506 sends a verification signal which so indicates. Conversely, if raw watermark data candidate 1512 and expected watermark data 1514 are not equivalent, comparison logic 1506 sends a verification signal which indicates that watermarked audio signal 1310 does not include a watermark corresponding to expected watermark data 1514.

By detecting and recognizing a watermark within watermarked audio signal 1310 (FIG. 13), watermark decoder 1300 can determine a source of watermarked audio signal 1310 and possibly identify watermarked audio signal 1310 as an unauthorized copy of watermarked signal 120 (FIG. 1). As described above, such detection and recognition of the watermark can survive substantial processing of watermarked audio signal 120.

Arbitrary Offsets of Watermarked Audio Signal 1310

Proper decoding of a watermark from watermarked audio signal 1310 generally requires a relatively close match between basis signal 1312 and basis signal 112, i.e., between the basis signal used to encode the watermark and the basis signal used to decode the watermark. The pseudo-random bit sequence generated by pseudo-random sequence generator 204 (FIG. 2) is aligned with the first sample of audio signal 110. However, if an unknown number of samples have been added to, or removed from, the beginning of watermarked audio signal 1310, the noise threshold spectrum which is analogous to noise threshold spectrum 210 (FIG. 2) and the pseudo-random bit stream used in spread-spectrum chipping are misaligned such that basis signal 1312 (FIG. 13) differs substantially from basis signal 112 (FIG. 1). As a result, any watermark encoded in watermarked audio signal 1310 would not be recognized in the decoding described above. Similarly, addition or removal of one or more scanlines of a still video image or of one or more pixels to each scanline of the still video image can result in a similar misalignment between a basis signal used to encode a watermark in the original image and a basis signal derived from the image after such pixels are added or removed. Motion video images have both a temporal component and a spatial component such that both temporal and spatial offsets can cause similar misalignment of encoding and decoding basis signals.

Accordingly, basis signals for respective offsets of watermarked audio signal 1310 are derived and the basis signal with the best correlation is used to decode a potential watermark from watermarked audio signal 1310. In general, maximum offsets tested in this manner are −5 seconds and +5 seconds, i.e., offsets representing prefixing of watermarked audio signal 1310 with five additional seconds of silent substantive content and removal of the first five seconds of substantive content of watermarked audio signal 1310. With a typical sampling rate of 44.1 kHz, 441,000 distinct offsets are included in this range of plus or minus five seconds. Deriving a different basis signal 1312 for each such offset is prohibitively expensive in terms of processing resources. Watermark alignment module 2000 (FIG. 20) determines the optimum of all offsets within the selected range of offsets, e.g., plus or minus five seconds, in accordance with the present invention. Watermark alignment module 2000 receives a leading portion of watermarked audio signal 1310, e.g., the first 30 seconds of substantive content. A noise spectrum generator 2002 forms noise threshold spectra 2010 in the manner described above with respect to noise spectrum generator 202 (FIG. 2). Secret key 2014 (FIG. 20), pseudo-random sequence generator 2004, chipper 2006, and filter bank 2008 receive a noise threshold spectrum from noise spectrum generator and form a basis signal candidate 2012 in the manner described above with respect to formation of basis signal 112 (FIG. 2) by secret key 214, pseudo-random sequence generator 204, chipper 206, and filter bank 208. Correlator 2020 (FIG. 20) and comparator 2026 evaluate basis signal candidate 2012 in a manner described more completely below.

Figure 21A:
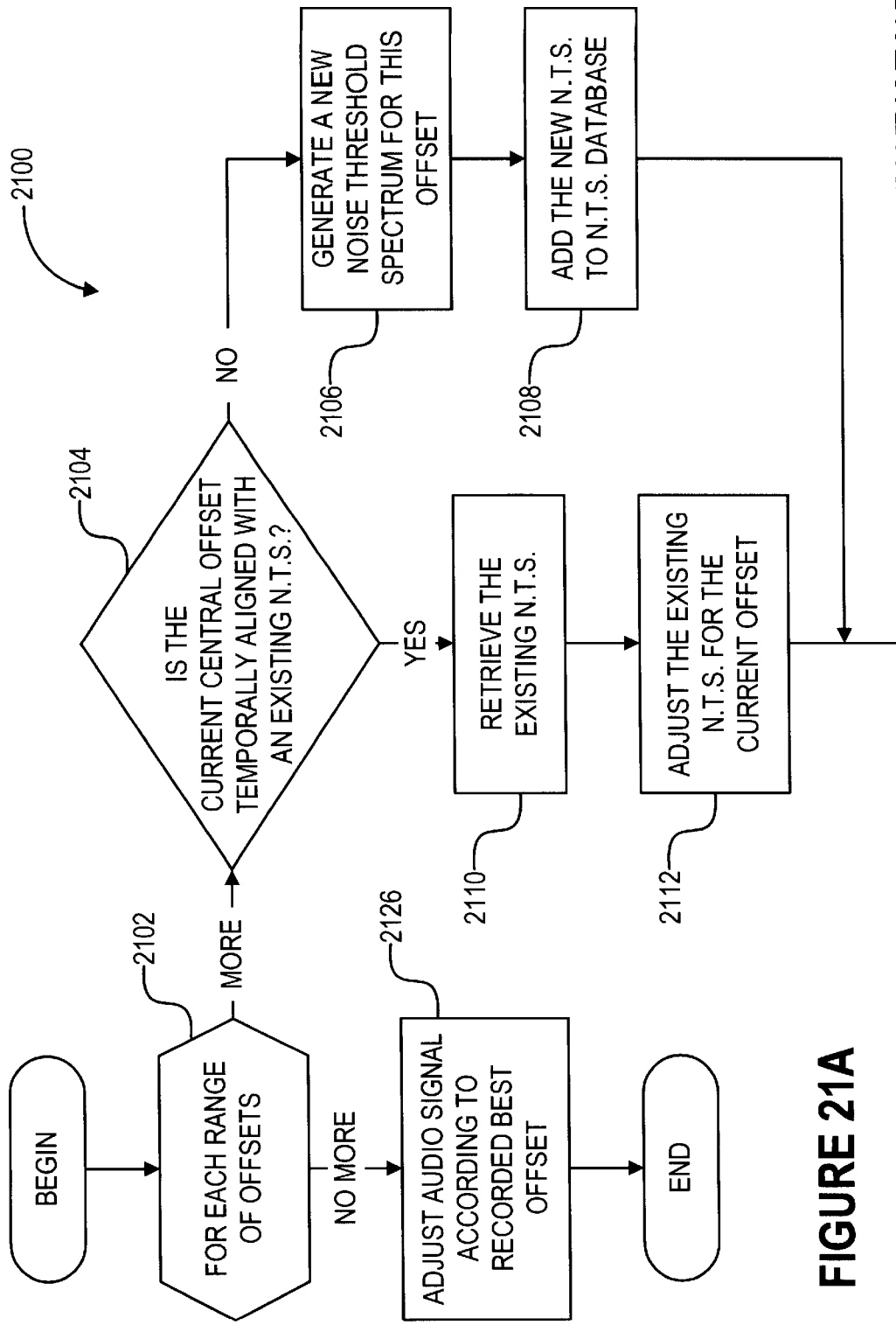
FIG. 21 is a logic flow diagram of the watermark alignment module of FIG. 20 in accordance with the present invention.

Processing by watermark alignment module 2000 is illustrated by logic flow diagram 2100 (FIG. 21). Processing according to logic flow diagram 2100 takes advantage of a few is characteristics of noise threshold spectra such as noise threshold spectra 2010. In an illustrative embodiment, noise threshold spectra 2010 represent frequency and signal power information for groups of 1,024 contiguous samples of watermarked audio signal 1310. One characteristic of noise threshold spectra 2010 change relatively little if watermarked audio signal 1310 is shifted in either direction only a relatively few samples. A second characteristic is that shifting watermarked audio signal 1310 by an amount matching the temporal granularity of a noise threshold spectrum results in an identical noise threshold spectrum with all values shifted by one location along the temporal domain. For example, adding 1,024 samples of silence to watermarked audio signal 1310 results in a noise threshold spectrum which represents as noise thresholds for the second 1,024 samples what would have been noise thresholds for the first 1,024 samples.

Watermark alignment module 2000 takes advantage of the first characteristic in steps 2116–2122 (FIG. 21). Loop step 2116 and next step 2122 define a loop in which each offset of a range of offsets is processed by watermark alignment module 2000 according to steps 2118–2120. In an illustrative embodiment, a range of offsets includes 32 offsets around a center offset, e.g.,−16 to +15 samples of a center offset. In this illustrative embodiment, offsets which are equivalent to between five extra seconds and five missing seconds of audio signal at 44.1 kHz, i.e., between −215,500 samples and +215,499 samples. An offset of −215,500 samples means that watermarked audio signal 1310 is prefixed with 215,500 additional samples, which typically represent silent subject matter. Similarly, an offset of +215,499 samples means that the first 215,499 samples of watermarked audio signal 1310 are removed. Since 32 offsets are considered as a single range of offsets, the first range of offsets includes offsets of −215,500 through −215,468, with a central offset of −215,484. Steps 2116–2122 rely upon basis signal candidate 2012 (FIG. 20) being formed for watermarked audio signal 1310 adjusted to the current central offset. For each offset of the current range of offsets, processing transfers from loop step 2116 (FIG. 21) to step 2118.

In step 2118, correlator 2020 (FIG. 20) of watermark alignment module 2000 correlates the basis signal candidate

Figure 20A:
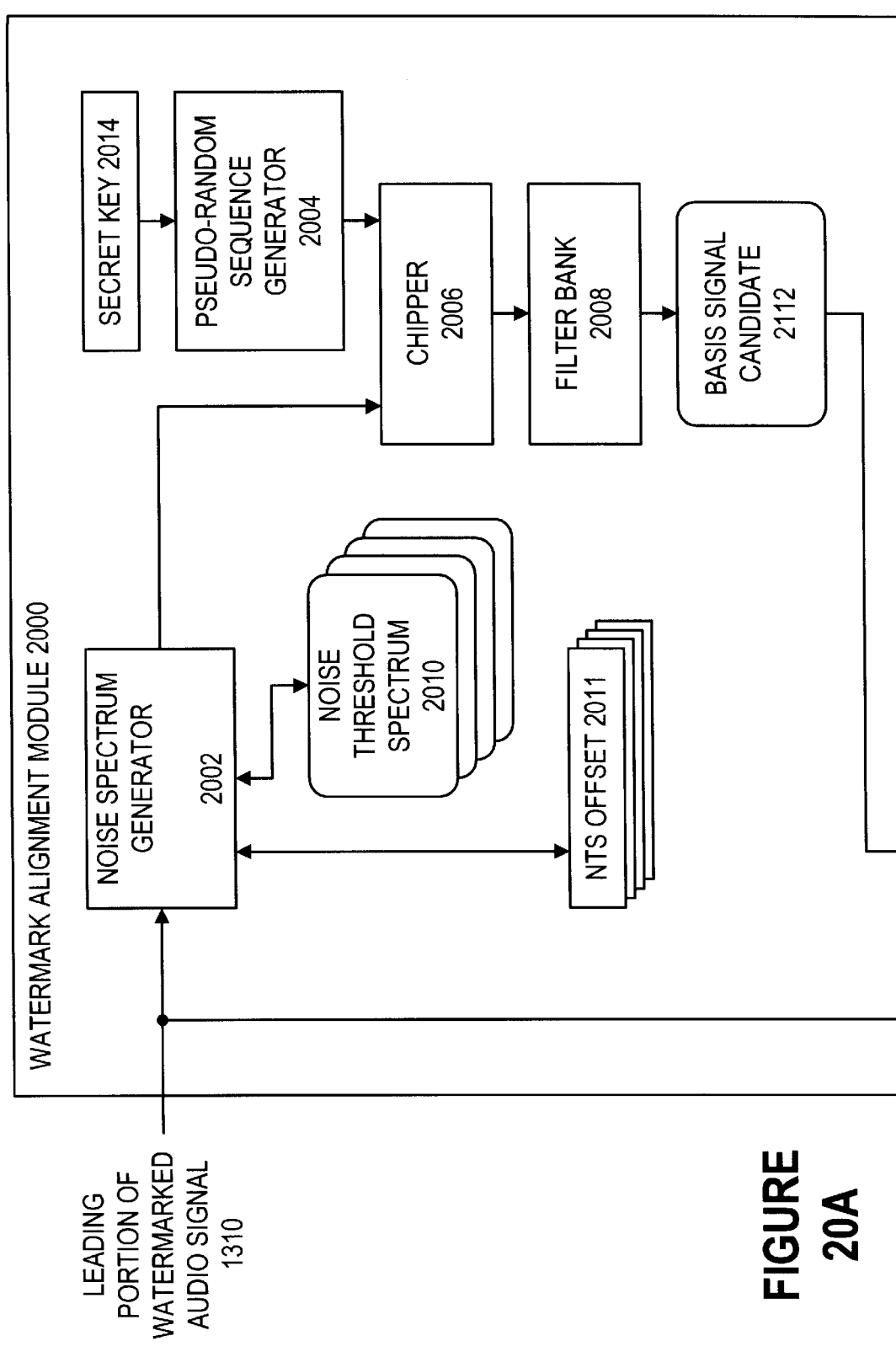
FIG. 20 is a block diagram of a watermark alignment module in accordance with the present invention.
Figures 20, 20B:
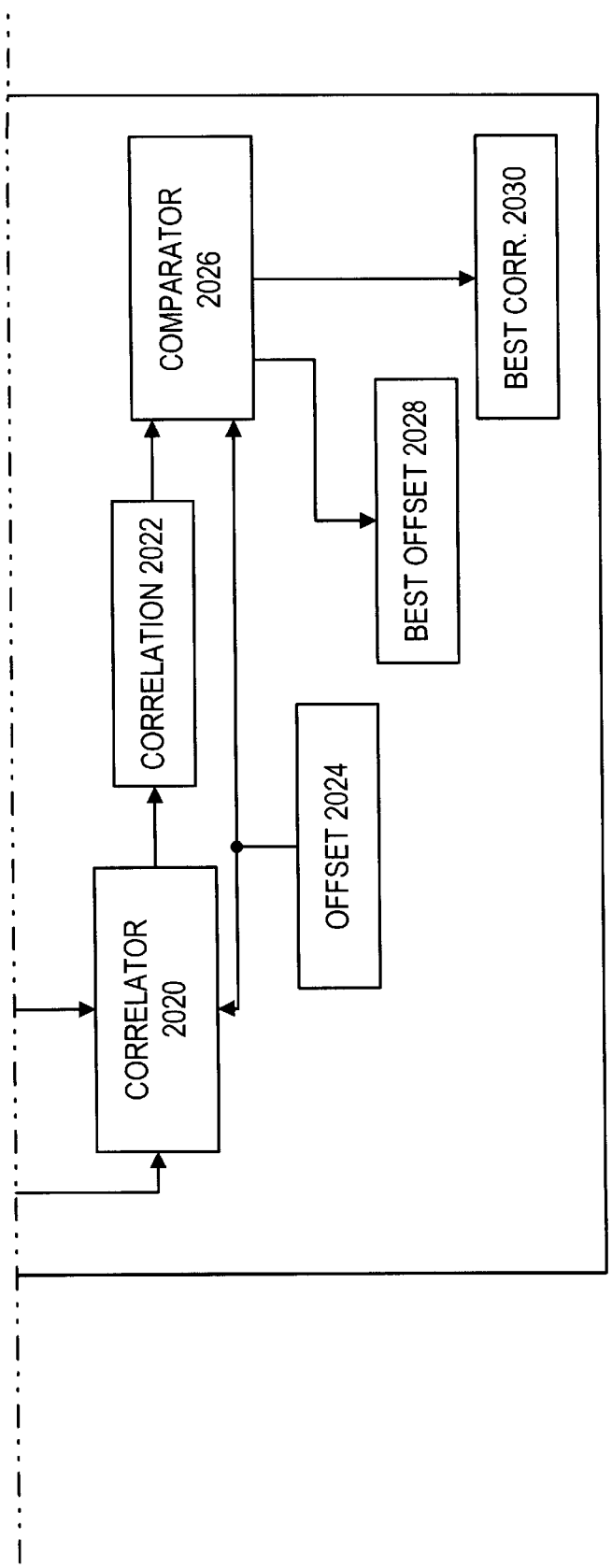

2012 with the leading portion of watermarked audio signal 1310 shifted in accordance with the current offset and stores the resulting correlation in a correlation record 2022. During steps 2116–2122 (FIG. 21) the current offset is stored and accurately maintained in offset record 2024 (FIG. 20). Thus, within the loop of steps 2116–2122 (FIG. 21), the same basis signal is compared to audio signal data shifted according to each of a number of different offsets. Such comparison is effective since relatively small offsets don't affect the correlation of the basis signal with the audio signal. Such is true, at least in part, since the spread-spectrum chipping to form the basis signal is performed in the spectral domain.

Processing transfers to step 2120 (FIG. 21) in which comparator 2026 determines whether the correlation represented in correlation record 2022 is the best correlation so far by comparison to data stored in best correlation record 2028. If and only if the correlation represented in correlation record 2022 is better than the correlation represented in best correlation record 2028, comparator 2026 copies the contents of correlation record 2022 into best correlation record 2028 and copies the contents of offset record 2024 into a best offset record 2030.

After step 2120 (FIG. 21), processing transfers through next step 2122 to loop step 2116 in which the next offset of the current range of offsets is processed according to steps 2118–2120. Steps 2116–2122 are performed within a bigger loop defined by a loop step 2102 and a next step 2124 in which ranges of offsets collectively covering the entire range of offsets to consider are processed individually according to steps 2104–2122. Since the same basis signal, e.g., basis signal candidate 2012 (FIG. 20), is used for each offset of a range of 32 offsets, the number of basis signals which much be formed to determine proper alignment of watermarked audio signal is reduced by approximately 97%. Specifically, in considering 441,000 different offsets (i.e., offsets within plus or minus five second of substantive content), one basis signal candidate is formed for each 32 offsets. As a result, 13,782 basis signal candidates are formed rather than 441,000.

Watermark alignment module 2000 takes advantage of the second characteristic of noise threshold spectra described above in steps 2104–2114 (FIG. 21). For each range of offsets, e.g., for each range of 32 offsets, processing transfers from loop step 2102 to test step 2104. In test step 2104, watermark alignment module 2000 determines whether the current central offset is temporally aligned with any existing one of noise threshold spectra 2010. As described above, noise threshold spectra 2010 have a temporal granularity in that frequencies and associated noise thresholds represented in noise spectra 2010 correspond to a block of contiguous samples, each corresponding to a temporal offset within watermarked audio signal 1310. In this illustrative embodiment, each such block of contiguous samples includes 1,024 samples. Each of noise threshold spectra 2010 has an associated NTS offset 2011. The current offset is temporally aligned with a selected one of noise threshold spectra 2010 if the current offset differs from the associated NTS offset 2011 by an integer multiple of the temporal granularity of the selected noise threshold spectrum, e.g., by an integer multiple of 1,024 samples.

In test step 2104 (FIG. 21), noise spectrum generator 2002 (FIG. 20) determines whether the current central offset is temporally aligned with any existing one of noise threshold spectra 2010 by determining whether the current central offset differs from any of NTS offsets 2011 by an integer multiple of 1,024. If so, processing transfers to step 2110 (FIG. 21) which is described below in greater detail. Otherwise, processing transfers to step 2106. In the first iteration of the loop of steps 2102–2124, noise threshold spectra 2010 (FIG. 20) do not yet exist. If noise threshold spectra 2010 persist following previous processing according to logic flow diagram, e.g., to align a watermarked audio signal other than watermarked audio signal 1310, noise threshold spectra 2010 are discarded before processing according to logic flow diagram 2100 begins anew.

In step 2106, noise spectrum generator 2002 (FIG. 20) generated a new noise threshold in the manner described above with respect to noise spectrum generator 202 (FIG. 2). In step 2108, noise spectrum generator 2002 (FIG. 20) stores the resulting noise threshold spectrum as one of noise threshold spectra 2010 and stores the current central offset as a corresponding one of NTS offsets 2011. Processing transfers from step 2108 to step 2114 which is described more completely below.

As described above, processing transfers to step 2110 if the current central offset is temporally aligned with one of noise threshold spectra 2010 (FIG. 20). In step 2110 (FIG. 21), noise spectrum generator 2002 (FIG. 20) retrieves the temporally aligned noise threshold spectrum. In step 2112 (FIG. 21), noise spectrum generator 2002 (FIG. 20) temporally shifts the noise thresholds of the retrieved noise threshold spectrum to be aligned with the current central offset. For example, if the current central offset differs from the NTS offset of the retrieved noise threshold spectrum by 1,024 samples, noise spectrum generator 2002 aligns the noise threshold spectrum by moving the noise thresholds for the second block of 1,024 samples to now correspond to the first 1,024 and repeating this shift of noise threshold data throughout the blocks of the retrieved noise threshold spectrum. Lastly, noise spectrum generator 2002 generates noise threshold data for the last block of 1,024 samples in the manner described above with respect to noise spectrum generator 202 (FIG. 3). However, the amount of processing resources required to do so for just one block of 1,024 samples is a very small fraction of the processing resources required to generate one of noise threshold spectra 2010 anew. Noise spectrum generator 2002 replaces the retrieved noise threshold spectrum with the newly aligned noise threshold spectrum in noise threshold spectra 2010. In addition, noise spectrum generator 2002 replaces the corresponding one of NTS offsets 2011 with the current central offset.

From either step 2112 or step 2108, processing transfers to step 2114 in which pseudo-random sequence generator 2004, chipper 2006, and filter bank 2008 form basis signal candidate 2012 from the noise threshold spectrum generated in either step 2106 or step 2112 in generally the manner described above with respect to basis signal generator 102 (FIG. 2). Processing transfers to steps 2116–2122 which are described above and in which basis signal candidate 2012 is correlated with each offset of the current range of offsets in the manner described above. Thus, only a relatively few noise threshold spectra 2010 are required to evaluate a relative large number of distinct offsets in aligning watermarked audio signal 1310 for relatively optimal watermark recognition.

The following is illustrative. In this embodiment, thirty-two offsets are grouped into a single range processed according to the loop of steps 2102–2124 as described above. As further described above, the first range processed in this illustrative embodiment includes offsets of −215,500 through −215,469, with a central offset of −215,484. In steps 2104–2112, noise spectrum generator 2002 determines that the central offset of −215,484 samples is not temporally aligned with an existing one of noise threshold spectra 2010 since initially no noise threshold spectra 2010 are yet formed. Accordingly, one of noise threshold spectra 2010 is formed corresponding to the central offset of −215,484 samples.

The next range processed in the loop of steps 2102–2124 includes offsets of −215,468 through −215,437, with a central offset of −215,452 samples. This central offset differs from the NTS offset 2011 associated with the only currently existing noise threshold spectrum 2010 by thirty-two and is therefore not temporally aligned with the noise threshold spectrum. Accordingly, another of noise threshold spectra 2010 is formed corresponding to the central offset of −215,452 samples. This process is repeated for central offsets of −215,420, −215,388, −215,356, . . . and −214,460 samples. In processing a range of offsets with a central offset of −214,460 samples, noise spectrum generator 2002 recognizes in test step 2104 that a central offset of −214,460 samples differs from a central offset of −215,484 samples by 1,024 samples. The latter central offset is represented as an NTS offset 2011 stored in the first iteration of the loop of steps 2102–2124 as described above. Accordingly, the associated one of noise threshold spectra 2010 is temporally aligned with the current central offset. Noise spectrum generator 2002 retrieves and temporally adjusts the temporally aligned noise threshold spectrum in the manner described above with respect to step 2112, obviating generation of another noise threshold spectrum anew.

In this illustrative embodiment, each range of offsets includes thirty-two offsets and the temporal granularity of noise threshold spectra 2010 is 1,024 samples. Accordingly, only thirty-two noise threshold spectra 2010 are required since each group of 1,024 contiguous samples in noise threshold spectra 2010 has thirty-two groups of thirty-two contiguous offsets. Thus, to determine a best offset in a overall range of 441,000 distinct offsets, only thirty-two noise threshold spectra 2010 are required. Since the vast majority of processing resources required to generate a basis signal candidate such as basis signal candidate 2012 is used to generate a noise threshold spectrum, generating thirty-two rather than 441,000 distinct noise threshold spectra reduces the requisite processing resources by four orders of magnitude. Such is a significant improvement over conventional watermark alignment mechanisms.

Operating Environment

Figure 22:
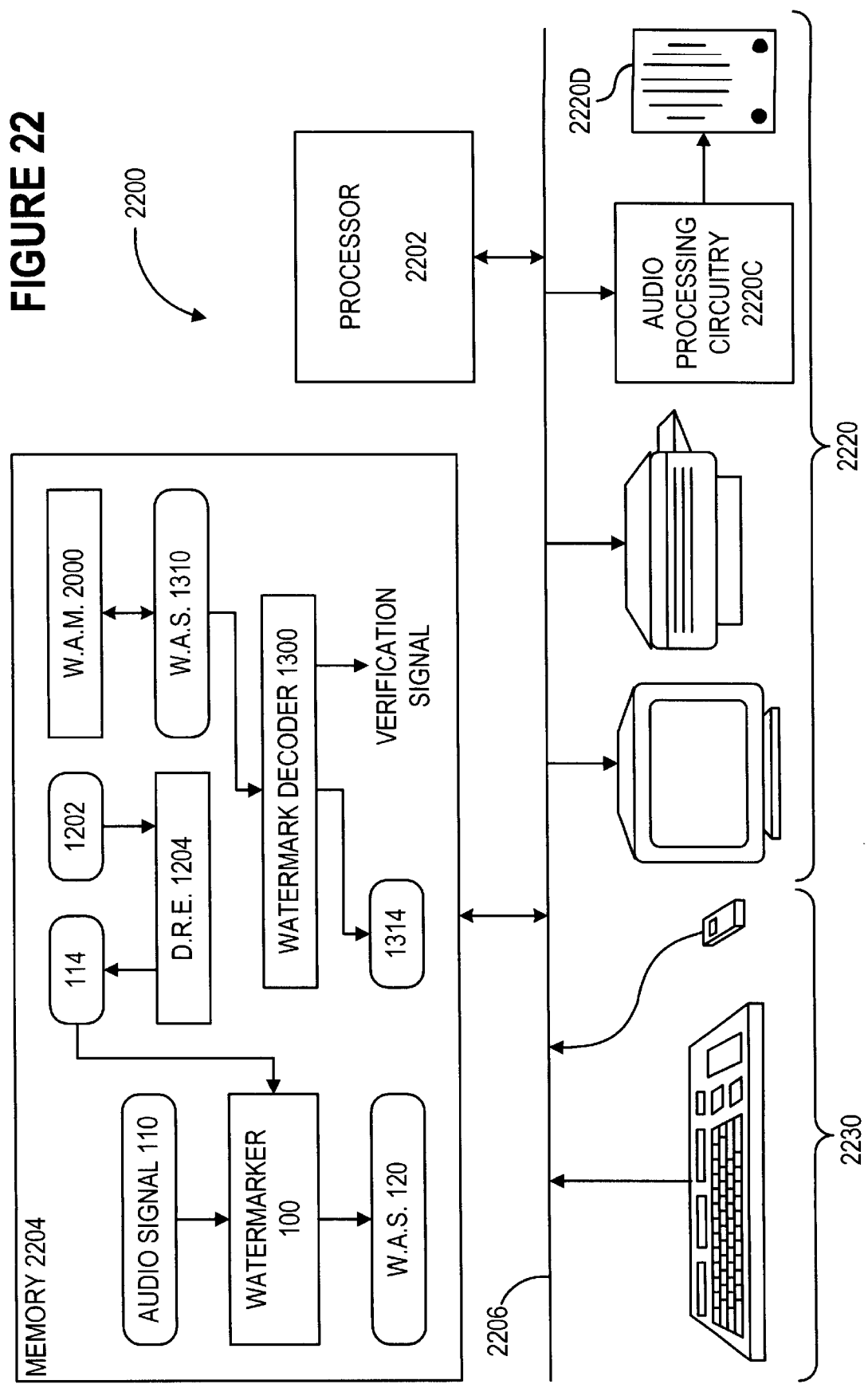
FIG. 22 is a block diagram of a computer system within which the watermarker, data robustness enhancer, watermark decoder, and watermark alignment module execute.

Watermarker 100 (FIGS. 1 and 22), data robustness enhancer 1204 (FIGS. 12 and 22), watermark decoder 1300 (FIGS. 13 and 22), and watermark alignment module 2000 (FIGS. 20 and 22) execute within a computer system 2200 which is shown in FIG. 22. Computer system 2200 includes a processor 2202 and memory 2204 which is coupled to processor 2202 through an interconnect 2206. Interconnect 2206 can be generally any interconnect mechanism for computer system components and can be, e.g., a bus, a crossbar, a mesh, a torus, or a hypercube. Processor 2202 fetches from memory 2204 computer instructions and executes the fetched computer instructions. Processor 2202 also reads data from and writes data to memory 2204 and sends data and control signals through interconnect 2206 to one or more computer display devices 2220 and receives data and control signals through interconnect 2206 from one or more computer user input devices 2230 in accordance with fetched and executed computer instructions.

Memory 2204 can include any type of computer memory and can include, without limitation, randomly accessible memory (RAM), read-only memory (ROM), and storage devices which include storage media such as magnetic and/or optical disks. Memory 2204 includes watermarker 100, data robustness enhancer 1204, watermark decoder 1300, and watermark alignment module 2000, each of which is all or part of one or more computer processes which in turn execute within processor 2202 from memory 2204. A computer process is generally a collection of computer instructions and data which collectively define a task performed by computer system 2200.

Each of computer display devices 2220 can be any type of computer display device including without limitation a printer, a cathode ray tube (CRT), a light-emitting diode (LED) display, or a liquid crystal display (LCD). Each of computer display devices 2220 receives from processor 2202 control signals and data and, in response to such control signals, displays the received data. Computer display devices 2220, and the control thereof by processor 2202, are conventional.

In addition, computer display devices 2220 include a loudspeaker 2220D which can be any loudspeaker and can include amplification and can be, for example, a pair of headphones. Loudspeaker 2220D receives sound signals from audio processing circuitry 2220C and produces corresponding sound for presentation to a user of computer system 2200. Audio processing circuitry 2220C receives control signals and data from processor 2202 through interconnect 2206 and, in response to such control signals, transforms the received data to a sound signal for presentation through loudspeaker 2220D.

Each of user input devices 2230 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 2230 generates signals in response to physical manipulation by the listener and transmits those signals through interconnect 2206 to processor 2202.

As described above, watermarker 100, data robustness enhancer 1204, watermark decoder 1300, and watermark alignment module 2000 execute within processor 2202 from memory 2204. Specifically, processor 2202 fetches computer instructions from watermarker 100, data robustness enhancer 1204, watermark decoder 1300, and watermark alignment module 2000 and executes those computer instructions. Processor 2202, in executing data robustness enhancer 1204, retrieves raw watermark data 1202 and produces therefrom robust watermark data 114 in the manner described above. In executing watermarker 100, processor 2202 retrieves robust watermark data 114 and audio signal 110 and imperceptibly encodes robust watermark data 114 into audio signal 110 to produce watermarked audio signal 120 in the manner described above.

In addition, processor 2202, in executing watermark alignment module 2000, determines a relatively optimum offset for watermarked audio signal 1310 according to which a watermark is most likely to be found within watermarked audio signal 1310 and adjusted watermarked audio signal 1310 according to the relatively optimum offset. In executing watermark decoder 1300, processor 2202 retrieves watermarked audio signal 1310 and produces watermark candidate 1314 in the manner described above.

While it is shown in FIG. 22 that watermarker 100, data robustness enhancer 1204, watermark decoder 1300, and watermark alignment module 2000 all execute within the same computer system, it is appreciated that each can execute in a separate computer system or can be distributed among several computers of a distributed computing environment using conventional techniques. Since data robustness enhancer 1204 produces robust watermark data 114 and watermarker 100 uses robust watermark data 114, it is preferred that data robustness enhancer 1204 and watermarker 100 operate relatively closely with one another, e.g., in the same computer system or in the same distributed computing environment. Similarly, it is generally preferred that watermark alignment module 2000 and watermark decoder 1300 execute in the same computer system or the same distributed computing environment since watermark alignment module 2000 pre-processes watermarked audio signal 1310 after which watermark decoder 1300 processes watermarked audio signal 1310 to produce watermark candidate 1314.

The above description is illustrative only and is not limiting. The present invention is limited only by the claims which follow.

What is claimed is:

1. A method for obscuring subject data, the method comprising:
    producing a stream of data bits by:
        (a) initializing a state which includes a number of data bits;
        (b) deriving new data from the state;
        (c) changing the data of the state; and
        (d) including the new data in the stream of data bits; and
    obscuring the subject data by spread-spectrum chipping in accordance with the stream of data bits
    wherein (c) changing comprises:
        including the new data within the state; and
        discarding a least recently generated portion of the state.

2. The method of claim 1 wherein (c) changing further comprises:
    shifting a most recently generated portion of the state.

3. The method of claim 2 wherein the most recently generated portion is the most significant portion.

4. The method of claim 2 wherein the most recently generated portion is the least significant portion.

5. The method of claim 2 wherein (c) changing results in the state consisting of the new data and the most recently generated portion of the state.

6. A method for obscuring subject data, the method comprising:
    producing a stream of data bits by:
        (a) initializing a state which includes a number of data bits;
        (b) deriving new data from the state;
        (c) changing the data of the state; and
        (d) including the new data in the stream of data bits; and
    obscuring the subject data by spread-spectrum chipping in accordance with the stream of data bits
    wherein producing further comprises:
        repeating steps (b) through (d).

7. A method for decoding embedded data from a digitized analog signal, the method comprising:
    producing a stream of data bits by:
        (a) initializing a state which includes a number of data bits;
        (b) deriving new data from the state;
        (c) changing the data of the state; and
        (d) including the new data in the stream of data bits;
    forming a basis candidate signal according to the stream of data bits;
    correlating the basis candidate signal with the digitized analog signal to form a correlation signal; and
    decoding the embedded data from the correlation signal.

8. The method of claim 7 wherein (c) changing comprises:
    changing the data of the state in accordance with the new data.

9. The method of claim 7 wherein (c) changing comprises:
    including the new data within the state.

10. The method of claim 9 wherein (c) changing further comprises:
    discarding a least recently generated portion of the state.

11. The method of claim 10 wherein (c) changing further comprises:
    shifting a most recently generated portion of the state.

12. The method of claim 11 wherein the most recently generated portion is the most significant portion.

13. The method of claim 11 wherein the most recently generated portion is the least significant portion.

14. The method of claim 7 wherein the basis candidate signal is a watermark candidate signal.

15. The method of claim 7 wherein producing further comprises:
    repeating steps (b) through (d).

16. The method of claim 9 wherein (c) changing results in the state consisting of the new data and the most significant bits as shifted to least significant positions within the state.

17. The method of claim 7 wherein forming a basis candidate signal comprises:
    spread-spectrum chipping in accordance with the stream of data bits.

18. A computer readable medium useful in association with a computer which includes a processor and a memory, the computer readable medium including computer instructions which are configured to cause the computer to obscure subject data by:
    producing a stream of data bits by:
        (a) initializing a state which includes a number of data bits;
        (b) deriving new data from the state;
        (c) changing the data of the state; and
        (d) including the new data in the stream of data bits; and
    obscuring the subject data by spread-spectrum chipping in accordance with the stream of data bits
    wherein (c) changing comprises:
        including the new data within the state; and
        discarding a least recently generated portion of the state.

19. The computer readable medium of claim 18 wherein (c) changing further comprises:
    shifting a most recently generated portion of the state.

20. The computer readable medium of claim 19 wherein the most recently generated portion is the most significant portion.

21. The computer readable medium of claim 19 wherein the most recently generated portion is the least significant portion.

22. The computer readable medium of claim 19 wherein (c) changing results in the state consisting of the new data and the most significant bits as shifted to least significant positions within the state.

23. A computer readable medium useful in association with a computer which includes a processor and a memory, the computer readable medium including computer instructions which are configured to cause the computer to obscure subject data by:
    producing a stream of data bits by:
        (a) initializing a state which includes a number of data bits;
        (b) deriving new data from the state;
        (c) changing the data of the state; and (d) including the new data in the stream of data bits; and obscuring the subject data by spread-spectrum chipping in accordance with the stream of data bits wherein producing further comprises:
repeating steps (b) through (d).

24. A computer readable medium useful in association with a computer which includes a processor and a memory, the computer readable medium including computer instructions which are configured to cause the computer to decode embedded data from a digitized analog signal by:

producing a stream of data bits by:
(a) initializing a state which includes a number of data bits;
(b) deriving new data from the state;
(c) changing the data of the state; and
(d) including the new data in the stream of data bits;

forming a basis candidate signal according to the stream of data bits;

correlating the basis candidate signal with the digitized analog signal to form a correlation signal; and decoding the embedded data from the correlation signal.

25. The computer readable medium of claim 24 wherein (c) changing comprises:
changing the data of the state in accordance with the new data.

26. The computer readable medium of claim 24 wherein (c) changing comprises:
including the new data within the state.

27. The computer readable medium of claim 26 wherein (c) changing further comprises:
discarding a least recently generated portion of the state.

28. The computer readable medium of claim 27 wherein (c) changing further comprises:
shifting a most recently generated portion of the state.

29. The computer readable medium of claim 28 wherein the most recently generated portion is the most significant portion.

30. The computer readable medium of claim 28 wherein the most recently generated portion is the least significant portion.

31. The computer readable medium of claim 28 wherein (c) changing results in the state consisting of the new data and the most significant bits as shifted to least significant positions within the state.

32. The computer readable medium of claim 24 wherein the basis candidate signal is a watermark candidate signal.

33. The computer readable medium of claim 24 wherein producing further comprises:
repeating steps (b) through (d).

34. The computer readable medium of claim 24 wherein forming a basis candidate signal comprises:
spread-spectrum chipping in accordance with the stream of data bits.

35. A computer system comprising:
a processor;
a memory operatively coupled to the processor; and
an encoding module (i) which executes in the processor from the memory and (ii) which, when executed by the processor, causes the computer to obscure subject data by:
producing a stream of data bits by:
(a) initializing a state which includes a number of data bits;
(b) deriving new data from the state;
(c) changing the data of the state; and
(d) including the new data in the stream of data bits; and obscuring the subject data by spread-spectrum chipping in accordance with the stream of data bits wherein (c) changing comprises:
including the new data within the state; and
discarding a least recently generated portion of the state.

36. The computer system of claim 35 wherein (c) changing further comprises:
shifting a most recently generated portion of the state.

37. The computer system of claim 36 wherein the most recently generated portion is the most significant portion.

38. The computer system of claim 36 wherein the most recently generated portion is the least significant portion.

39. The computer system of claim 36 wherein (c) changing results in the state consisting of the new data and the most significant bits as shifted to least significant positions within the state.

40. A computer system comprising:
a processor;
a memory operatively coupled to the processor; and
an encoding module (i) which executes in the processor from the memory and (ii) which, when executed by the processor, causes the computer to obscure subject data by:
producing a stream of data bits by:
(a) initializing a state which includes a number of data bits;
(b) deriving new data from the state;
(c) changing the data of the state; and
(d) including the new data in the stream of data bits; and obscuring the subject data by spread-spectrum chipping in accordance with the stream of data bits wherein producing further comprises:
repeating steps (b) through (d).

41. A computer system comprising:
a processor;
a memory operatively coupled to the processor; and
an encoding module (i) which executes in the processor from the memory and (ii) which, when executed by the processor, causes the computer to decode embedded data from a digitized analog signal by:
producing a stream of data bits by:
(a) initializing a state which includes a number of data bits;
(b) deriving new data from the state;
(c) changing the data of the state; and
(d) including the new data in the stream of data bits;

forming a basis candidate signal according to the stream of data bits;

correlating the basis candidate signal with the digitized analog signal to form a correlation signal; and decoding the embedded data from the correlation signal.

42. The computer system of claim 41 wherein (c) changing comprises:
changing the data of the state in accordance with the new data.

43. The computer system of claim 41 wherein (c) changing comprises:
including the new data within the state.

44. The computer system of claim 43 wherein (c) changing further comprises:
discarding a least recently generated portion of the state.

45. The computer system of claim 44 wherein (c) changing further comprises:

shifting a most recently generated portion of the state.

46. The computer system of claim 45 wherein the most recently generated portion is the most significant portion.

47. The computer system of claim 45 wherein the most recently generated portion is the least significant portion.

48. The computer system of claim 45 wherein (c) changing results in the state consisting of the new data and the most significant bits as shifted to least significant positions within the state.

49. The computer system of claim 41 wherein the basis candidate signal is a watermark candidate signal.

50. The computer system of claim 41 wherein producing further comprises:

repeating steps (b) through (d).

51. The computer system of claim 41 wherein forming a basis candidate signal comprises:

spread-spectrum chipping in accordance with the stream of data bits.

* * * * *